United States Patent
Shaw et al.

(10) Patent No.: US 10,711,073 B2
(45) Date of Patent: Jul. 14, 2020

(54) METHOD OF MAKING A BRANCHED POLYMER, A BRANCHED POLYMER AND USES OF SUCH A POLYMER

(71) Applicant: SYNTHOMER (UK) LIMITED, Harlow, Essex (GB)

(72) Inventors: Peter Shaw, Harlow (GB); Jon Batty, Harlow (GB); Virginie Chabrol, Harlow (GB); Monika Farrell, Harlow (GB); Lena Sambe, Harlow (GB)

(73) Assignee: SYNTHOMER (UK) LIMITED, Harlow, Essex (GB)

( * ) Notice: Subject to any disclaimer, the term of this patent is extended or adjusted under 35 U.S.C. 154(b) by 355 days.

(21) Appl. No.: 15/129,731

(22) PCT Filed: Mar. 27, 2015

(86) PCT No.: PCT/GB2015/050937
§ 371 (c)(1),
(2) Date: Sep. 27, 2016

(87) PCT Pub. No.: WO2015/145173
PCT Pub. Date: Oct. 1, 2015

(65) Prior Publication Data
US 2017/0137542 A1   May 18, 2017

(30) Foreign Application Priority Data
Mar. 28, 2014 (GB) .................................. 1405624.6

(51) Int. Cl.
*C08F 2/06* (2006.01)
*C08F 2/20* (2006.01)
*C08F 2/38* (2006.01)
*C08F 8/12* (2006.01)

(52) U.S. Cl.
CPC .................. *C08F 2/38* (2013.01); *C08F 2/06* (2013.01); *C08F 2/20* (2013.01); *C08F 8/12* (2013.01)

(58) Field of Classification Search
CPC ...... C08F 2/06; C08F 2/20; C08F 2/38; C08F 8/12
See application file for complete search history.

(56) References Cited

U.S. PATENT DOCUMENTS

| | | | |
|---|---|---|---|
| 2,888,442 A | 5/1959 | Uraneck | |
| 4,072,806 A * | 2/1978 | Ravey | C08F 214/06 526/206 |
| 4,208,499 A | 6/1980 | Maruhashi et al. | |
| 4,368,275 A | 1/1983 | Yanagihara et al. | |
| 4,481,274 A | 11/1984 | Mitsuhashi et al. | |
| 4,489,192 A | 12/1984 | Shih et al. | |
| 4,839,448 A | 6/1989 | Jung et al. | |
| 5,164,282 A | 11/1992 | Mahabadi | |
| 5,308,911 A | 5/1994 | Takada et al. | |
| 5,349,008 A | 9/1994 | Takada et al. | |
| 5,484,866 A | 1/1996 | Loveless et al. | |
| 5,529,719 A | 6/1996 | Cunningham et al. | |
| 6,646,068 B2 | 11/2003 | Chisholm et al. | |
| 6,713,584 B1 | 3/2004 | Chisholm et al. | |
| 6,774,198 B2 | 8/2004 | Binder et al. | |
| 6,881,761 B2 | 4/2005 | Kotsuka et al. | |
| 7,244,796 B2 | 7/2007 | Chisholm et al. | |
| 7,498,395 B2 | 3/2009 | Chisholm et al. | |
| 7,750,074 B2 | 7/2010 | Yang et al. | |
| 8,222,325 B2 | 7/2012 | Michel et al. | |
| 8,426,518 B2 | 4/2013 | Kato et al. | |
| 8,603,730 B2 | 12/2013 | Knocke | |
| 8,686,096 B2 | 4/2014 | Deetz et al. | |
| 2004/0152834 A1 † | 8/2004 | Kato | |
| 2004/0236053 A1 | 11/2004 | Chisholm et al. | |
| 2006/0052563 A1 | 3/2006 | Nakagawa et al. | |
| 2006/0180956 A1 | 8/2006 | Kato et al. | |
| 2007/0184732 A1 | 8/2007 | Lunsford et al. | |
| 2009/0076211 A1 | 3/2009 | Yang et al. | |
| 2009/0111940 A1 | 4/2009 | Kato et al. | |
| 2009/0253880 A1 | 10/2009 | Shibutani et al. | |
| 2009/0258953 A1 | 10/2009 | Dobrawa et al. | |
| 2010/0144958 A1 | 6/2010 | Findlay et al. | |

(Continued)

FOREIGN PATENT DOCUMENTS

| CN | 1306546 A | 8/2001 |
|---|---|---|
| CN | 101421309 A | 4/2009 |

(Continued)

OTHER PUBLICATIONS

Baudry et al, "Facile Synthesis of Branched Poly(vinyl alcohol)s," Macromolecules, 2006, pp. 5230-5237, vol. 39:16.
Bouhier et al, "Synthesis of Densely Branched Poly(methyl methacrylate)s via ATR Copolymerization of Methyl Methacrylate and Ethylene Glycol Dimethacrylate," Journal of polymer science. Part A: Polymer Chemistry, 2007, pp. 2375-2386, vol. 45:12.
"Branching out", Specialty Chemicals Magazine (website).
Camerlynck et al, "Control of Branching Vs. Cross-Linking in Conventional Free Radical Copolymerization of MMA and EGDMA Using CoBF as a Catalytic Chain Transfer Agent," Journal of Macromolecular Science, Part B: Physics, 2005, pp. 881-895, vol. 44:6.

(Continued)

*Primary Examiner* — Irina S Zemel
*Assistant Examiner* — Jeffrey S Lenihan
(74) *Attorney, Agent, or Firm* — The Webb Law Firm

(57) ABSTRACT

A method of making a branched polymer comprising (C=C)—(C=C)—CO groups is provided. The method comprises: (i) Providing, in admixture, at least one monofunctional monomer comprising one polymerisable carbon-carbon double bond per monomer, at least one multifunctional monomer comprising at least two polymerisable carbon-carbon double bonds per monomer, at least one chain transfer agent comprising a carbonyl group; (ii) Forming a polymer from the mixture; and (iii) Hydrolysing the polymer. A branched polymer is further provided.

25 Claims, No Drawings

(56) References Cited

U.S. PATENT DOCUMENTS

| | | |
|---|---|---|
| 2010/0324198 A1 | 12/2010 | Nii et al. |
| 2011/0172314 A1 | 7/2011 | Findlay et al. |
| 2012/0059069 A1 | 3/2012 | Findlay et al. |
| 2012/0077937 A1 | 3/2012 | Pascal et al. |
| 2012/0095110 A1 | 4/2012 | Findlay et al. |

FOREIGN PATENT DOCUMENTS

| | | | |
|---|---|---|---|
| EP | 0103199 A2 | | 3/1984 |
| EP | 0450317 A1 | | 10/1991 |
| EP | 0686881 A1 | | 12/1995 |
| EP | 0872494 A2 | | 10/1998 |
| EP | 09828797 B1 | | 7/1999 |
| EP | 1000726 B1 | | 5/2000 |
| EP | 1062248 B1 | | 12/2000 |
| EP | 1062258 B1 | | 12/2000 |
| EP | 1160260 A1 | | 12/2001 |
| EP | 1388545 B1 | | 2/2004 |
| EP | 1764374 A1 | | 3/2007 |
| EP | 1832607 A1 | | 9/2007 |
| EP | 2006307 B1 | | 7/2008 |
| EP | 2006307 A1 | * | 12/2008 |
| EP | 2091982 B1 | | 8/2009 |
| EP | 2102256 B1 | | 9/2009 |
| EP | 2102259 B1 | | 9/2009 |
| EP | 2112171 B1 | | 10/2009 |
| GB | 967051 | | 8/1964 |
| GB | 1497237 | | 1/1978 |
| GB | 2002789 A | | 2/1979 |
| GB | 2294467 A | | 5/1996 |
| JP | 5730945 A | | 2/1982 |
| JP | 57108662 A | | 7/1982 |
| JP | 59166505 A | | 9/1984 |
| JP | 61108602 A | | 5/1986 |
| JP | 61108602 A6 | | 5/1986 |
| JP | 61108603 A | | 5/1986 |
| JP | 6475505 A | | 3/1989 |
| JP | 1240501 A | | 9/1989 |
| JP | 588251 B2 | | 12/1993 |
| JP | H05-088251 B2 | † | 12/1993 |
| JP | 8283313 A | | 10/1996 |
| JP | H08-283313 A | † | 10/1996 |
| JP | 10287721 A | | 10/1998 |
| JP | 2004189888 A | | 7/2004 |
| JP | 2004189889 A | | 7/2004 |
| JP | 2005-350557 A | † | 12/2005 |
| JP | 2005350557 A | | 12/2005 |
| JP | 2006241448 A | | 9/2006 |
| RU | 2265617 C2 | | 12/2005 |
| WO | 9637525 A1 | | 11/1996 |
| WO | 2008015739 A1 | | 2/2008 |
| WO | 2008071660 A1 | | 6/2008 |
| WO | 2008071661 A1 | | 6/2008 |
| WO | 2008071662 A1 | | 6/2008 |
| WO | 2009144471 A1 | | 12/2009 |
| WO | 2010089571 A1 | | 8/2010 |
| WO | 2010149957 A1 | | 12/2010 |
| WO | 2012113896 A1 | | 8/2012 |
| WO | 2013005050 A1 | | 1/2013 |
| WO | WO-2014199175 A1 | * | 12/2014 |

OTHER PUBLICATIONS

Chisholm et al, "The Application of the "Strathcycle Route" to Branched Vinyl Polymers in Suspension Polymerization: Architectural, Thermal, and Rheological Characterization of the Derived Branched Products," Macromolecules, 2009, pp. 7745-7752, vol. 42:20.

"DSM", DSM Hybrane Homepage (website), (Feb. 13, 2018).

England et al, "Hyper/highly-branched polymers by radical polymerisations," Polymer Chemistry, 2010, pp. 1533-1544, vol. 1:10.

Gao et al, "Hyhperbranched polymers: from synthesis to applications," Progress in Polymer Science, 2004, pp. 183-275, vol. 29:3.

Han et al, "Lightly Branched Poly(vinyl alcohol) for Fluid Loss Additive," Journal of Applied Polymer Science, 2013, pp. 4608-4612, vol. 130:6.

Hult et al, "Hyperbranched Polymers," Advances in Polymer Science, 1999, pp. 1-34, vol. 143.

Isaure et al, "Facile synthesis of branched poly(methyl methacrylate)s," The Journal of Materials Chemistry, 2003, pp. 2701-2710, vol. 13:11.

Isaure et al, "Synthesis of branched poly(methyl methacrylate)s via controlled/living polymerisations exploiting ethylene glycol dimethacrylate as branching agent," Chemical Communications, 2004, pp. 1138-1139, Issue 9.

Jiang et al, "Radical Polymerization in the Presence of Chain Transfer Monomer: An Approach to Branched Vinyl Polymers," Macromolecules, 2012, pp. 4092-4100, vol. 45:10.

Li et al, "Synthesis and adsorption aspect of crosslinked PVA-based blood compatible adsorbents for LDL apheresis," Reactive & Functional Polymers, 2004, pp. 53-63, vol. 58:1.

Lindemann, "The Mechanism of Vinyl Acetate Polymerization," Mowilith Handbook, 1972, pp. 238-246, 5th Edition.

Liu et al, "Branched Polymer via Free Radical Polymerization of Chain Transfer Monomer: A Theoretical and Expenmental Investigation," Journal of Polymer Science: Part A: Polymer Chemistry, 2008, pp. 1449-1459, vol. 46:4.

Liu et al, "Effect of Branching on Polymer Diffusion on Branched Poly(butyl methacrylate) Latex Films," Macromolecules, 2008, pp. 9104-9111, vol. 41:23.

Liu et al, "Synthesis of Branched Poly(butyl methacrylate) via Semicontinuous Emulsion Polymerization," Macromolecules, 2008, pp. 4220-4225, vol. 41:12.

Liu et al, "One-pot synthesis of branched alternating copolymers P(St-alt-Man) via free radical polymerization in the presence of chain transfer monomer," Polymer Bulletin, 2013, pp. 1795-1803, vol. 70:6.

Ormondroyd, "The Influence of Poly(vinyl alcohol) Suspending Agents on Suspension Poly(vinyl chloride) Morphology," British Polymer Journal, 1988, pp. 353-359, vol. 20.

Poly et al, "Synthesis of Poly(vinyl acetate) Nanogels by Xanthate-Mediated Radical Crosslinking Copolymerizaion," Macromolecule Rapid Communications, 2008, pp. 1965-1972, vol. 29.

Roth et al, "Copolymerizations with Triallyl Cyanurate, Triallyl Isocyanurate, and Diallylmelamine," Journal of Polymer Science, 1961, pp. 41-48, vol. 55.

Sato et al, "Initiator-Fragment Incorporation Radical Polymerization of Divinyl Adipate with Dimethyl 2,2'-Azobis (isobutyrate): Kinetics and Formation of Soluble Hyperbranched Polymer," Macromolecules, 2003, pp. 1627-1632, vol. 38:5.

Roth, R. W., and Church, R. F., "Copolymerizations with Triallyl Cyanurate, Triallyl Isocyanurate, and Diallylmelamine," Journal of Polymer Science, 1961, vol. 55, pp. 41-48.†

Han, Haifeng, and Zhang, Junhua, "Lightly Branched Poly(vinyl alcohol) for Fluid Loss Additive," Journal of Applied Polymer Science, 2013, DOI: 10.1002/app.39741, pp. 4608-4612.†

* cited by examiner
† cited by third party ously known as butanal), isobutyraldehyde, pentanal, hexanal, isovaleraldehyde, 5-chloropentenal, 5,5-Dimethyl-1,3-cyclohexanedione (also known as dimedone), cyclohexanecarbaldehyde, 3-methylcycloheanecarbaldehyde, 3,3-dibromocylopentanecarbaldehyde, trans-2-methylcyclopentanecarbaldehyde, benzaldehyde, substituted benzaldehydes, crotonaldehyde, paraldehyde, chloral, pentanedial, butanedial, 4-hydroxbutanal, 4-hydroxy-3-methylbutanal or acetone, butan-2-one (often known as methyl ethyl ketone or MEK), methyl propyl ketone, methyl isopropyl ketone, methyl isobutyl ketone, ethyl propyl ketone, diethyl ketone, acetophenone, cyclohexanone, acetylacetone, benzophenone, or oxopentanal, 3,4-dioxopentanal, 3-methyl-3-oxo-butanal, butane-2,3-dione), 2,4-pentanedione, 2,3-hexanedione, cyclopentanone, 2-bromocyclopentanone, 4-hydroxycyclohexanone, 2-bromo-5-methylcyclohexanone, 1,4-cyclohexanedione, 1,2-cyclopentanedione, 4-hydroxy-2-butanone, 1,5-dihydroxy-3-pentanone, 4-penten-2-one, trans-3-pentenal, (E)-3-methyl-3-pentenal, (Z)-5-bromo-4-hexen-3-one, benzoin, furfural or substituted furfurals, and the like.

METHOD OF MAKING A BRANCHED POLYMER, A BRANCHED POLYMER AND USES OF SUCH A POLYMER

PRIORITY CLAIM

The present application is a National Phase entry of PCT Application No. PCT/GB2015/050937, filed Mar. 27, 2015, which claims priority from Great Britain Patent Application Number 1405624.6, filed Mar. 28, 2014, the disclosures of which are hereby incorporated by reference herein in their entirety.

FIELD OF THE INVENTION

The present invention concerns methods of making branched polymers, branched polymers and uses of said branched polymers, for example, as primary suspending agents in the suspension polymerisation of alkenyl monomers such as vinyl chloride.

BACKGROUND OF THE INVENTION

Suspension polymerisation of a monomer (such as vinyl chloride) typically uses a primary suspending agent. Such primary suspending agents typically help to control the size of the polymer particles and help inhibit coagulation of polymer particles. It is sometimes desirable to be able to make small polymer particles, but some known primary suspending agents do not facilitate the production of small polymer particles. Within this application the term "particle" is understood in its broadest sense and includes non-aggregated particles as well as particles formed from aggregates of polymerized monomer droplets, usually known in the state of the art as "grains".

Polymers containing carbonyl groups conjugated with carbon-carbon double bonds are known (such as Alcotex® B72, Synthomer (UK) Ltd) and some are used as primary suspending agents. However, some carbonyl-group containing polymers are yellow, and this colouration may not be acceptable to some users.

The present invention seeks to mitigate one or more of the above-mentioned problems. Alternatively or additionally, the present invention seeks to provide an alternative and/or improved primary suspending agent.

SUMMARY OF THE INVENTION

In accordance with a first aspect of the present invention, there is provided a free radical polymerisation method of making a branched polymer comprising (C═C)—(C═C)—CO groups, the method comprising:
(i) Providing, in admixture, at least one monofunctional monomer comprising one polymerisable carbon-carbon double bond per monomer, at least one multifunctional monomer comprising at least two polymerisable carbon-carbon double bonds per monomer, at least one chain transfer agent comprising an aldehyde or ketone, and optionally at least one polymerisation initiator; and
(ii) Forming a polymer from the mixture;
(iii) Hydrolysing the polymer thereby forming a hydrolysed polymer.

The (C═C)—(C═C)—CO groups are typically formed by the hydrolysis of a suitably modified poly(alkenyl alkanoate); there is no requirement for post-hydrolysis treatment, such as heating, to produce the (C═C)—(C═C)—CO structure. The (C═C)—(C═C)—CO groups are formed at the end of chains by virtue of the use of the carbonyl-containing chain transfer agent.

For the avoidance of doubt, the method of the present invention is a free radical polymerisation. The radicals may be generated using any means known to those skilled in the art, such as one or more of: a polymerisation initiator, redox chemicals and exposure to electromagnetic radiation of a suitable wavelength (such as ultraviolet radiation).

Those skilled in the art will realise that the step of hydrolysing the polymer does not necessarily produce a polymer of 100% hydrolysis.

For the avoidance of doubt, steps (i), (ii) and (iii) above are not necessarily separated and sequential steps. For example, the method of the present invention may comprise initially providing at least one monofunctional monomer, at least one multifunctional monomer and at least one polymerisation initiator in admixture, and subsequently adding at least chain transfer agent comprising an aldehyde or ketone. Polymerisation will take place in the absence of the chain transfer agent, but once at least one chain transfer agent is added, there will be an admixture comprising at least one monofunctional monomer, at least one multifunctional monomer, at least one chain transfer agent and at least one initiator from which a polymer is formed.

At least one chain transfer agent comprising an aldehyde or ketone may comprise from 1 to 20, optionally from 1 to 10, optionally from 2 to 6 and optionally from 2 to 4 carbon atoms. For example, at least one (and optionally each) of said chain transfer agents may comprise acetaldehyde, propionaldehyde (often known as propanal), butyraldehyde (often known as butanal), isobutyraldehyde, pentanal, hexanal, isovaleraldehyde, 5-chloropentenal, 5,5-Dimethyl-1,3-cyclohexanedione (also known as dimedone), cyclohexanecarbaldehyde, 3-methylcycloheanecarbaldehyde, 3,3-dibromocylopentanecarbaldehyde, trans-2-methylcyclopentanecarbaldehyde, benzaldehyde, substituted benzaldehydes, crotonaldehyde, paraldehyde, chloral, pentanedial, butanedial, 4-hydroxbutanal, 4-hydroxy-3-methylbutanal or acetone, butan-2-one (often known as methyl ethyl ketone or MEK), methyl propyl ketone, methyl isopropyl ketone, methyl isobutyl ketone, ethyl propyl ketone, diethyl ketone, acetophenone, cyclohexanone, acetylacetone, benzophenone, or oxopentanal, 3,4-dioxopentanal, 3-methyl-3-oxo-butanal, butane-2,3-dione), 2,4-pentanedione, 2,3-hexanedione, cyclopentanone, 2-bromocyclopentanone, 4-hydroxycyclohexanone, 2-bromo-5-methylcyclohexanone, 1,4-cyclohexanedione, 1,2-cyclopentanedione, 4-hydroxy-2-butanone, 1,5-dihydroxy-3-pentanone, 4-penten-2-one, trans-3-pentenal, (E)-3-methyl-3-pentenal, (Z)-5-bromo-4-hexen-3-one, benzoin, furfural or substituted furfurals, and the like.

The method may comprise providing more than one chain transfer agent. For example, the method may comprise providing a first chain transfer agent comprising a carbonyl group such as an aldehyde or a ketone, and a second chain transfer agent. The second chain transfer agent may optionally comprise an aldehyde or ketone, or the second chain transfer agent may optionally not comprise an aldehyde or ketone.

The amount of chain transfer agent comprising an aldehyde or ketone may be from 0.005 to 50 mol % of the amount of monofunctional monomer i.e. the number of moles of chain transfer agent comprising an aldehyde or ketone may optionally be from 0.005 to 50% of the number of moles of monofunctional monomer. This should be calculated using the total amount of chain transfer agent comprising an aldehyde or ketone and the total amount of monofunctional monomer, even if more than one monofunctional monomer and/or more than one chain transfer agent comprising an aldehyde or ketone is used.

The amount of chain transfer agent comprising an aldehyde or ketone may optionally be at least 0.005 mol %, at least 0.05 mol %, at least 0.5 mol %, at least 1 mol %, at least 5 mol %, at least 7 mol %, at least 10 mol %, no more than 20 mol %, no more than 25 mol %, no more than 30 mol %, no more than 40 mol %, no more than 45 mol %, and optionally no more than 50 mol % of the amount of monofunctional monomer, based on the total amount of chain transfer agent comprising an aldehyde or ketone and the total amount of monofunctional monomer. Optionally, the amount of chain transfer agent comprising an aldehyde or ketone may optionally be from 0.5 to 50 mol %, from 0.5 to 45 mol %, from 0.5 to 30 mol %, from 1 to 25 mol %, from 5 to 45 mol %, from 5 to 25 mol %, from 7 to 40 mol %, from 10 to 25 mol % and optionally from 10 to 20 mol % of the amount of monofunctional monomer, based on the total amount of chain transfer agent comprising an aldehyde or ketone and the total amount of monofunctional monomer. The amount of said chain transfer agent may, for example, depend on the nature of the solvent used. For example, some solvents have a relatively high chain transfer constant for the polymerisation reaction in question, and therefore it may not be necessary to use large amounts of said chain transfer agent in order to inhibit the formation of gels. For example, a solvent which comprises a relatively high isopropanol content reduces the amount of chain transfer agent required to inhibit gel formation when the monofunctional monomer is vinyl acetate because the isopropanol has a relatively high chain transfer constant for the polymerisation of vinyl acetate. However, those skilled in the art will realise that incorporation of a solvent residue, instead of a chain transfer agent residue, into a polymer may not be desirable from the point of view of incorporating into the polymer the requisite carbonyl functionality associated with the chain transfer agent residue from an aldehyde or ketone. Those skilled in the art will realise that solvents with very low chain transfer constants may be used.

The ratio of the number of moles of the chain transfer agent comprising an aldehyde or ketone to the number of moles of multifunctional monomer may be at least 10:1, at least 20:1, at least 30:1, at least 50:1, at least 70:1, at least 100:1 and at least 120:1, based on the total amount of chain transfer agent comprising an aldehyde or ketone and the total amount of multifunctional monomer. The ratio of the number of moles of the chain transfer agent comprising an aldehyde or ketone to the number of moles of multifunctional monomer may be no more than 100:1, no more than 120:1, no more than 150:1, no more than 200:1 and optionally no more than 300:1, based on the total amount of chain transfer agent comprising an aldehyde or ketone and the total amount of multifunctional monomer. For example, for solution polymerisation, the relative amount of said chain transfer agent is typically higher than for a suspension polymerisation and therefore the ratio in solution polymerisation may be, for example, at least 50:1, optionally at least 70:1, optionally at least 90:1, optionally no more than 150:1, optionally no more than 200:1 and optionally no more than 300:1, based on the total amount of chain transfer agent comprising an aldehyde or ketone and the total amount of multifunctional monomer. For example, the ratio of the number of moles of the chain transfer agent comprising an aldehyde or ketone to the number of moles of multifunctional monomer may be from 30:1 to 200:1, optionally from 50:1 to 150:1 and optionally from 70:1 to 120:1, based on the total amount of chain transfer agent comprising an aldehyde or ketone and the total amount of multifunctional monomer.

For suspension polymerisation, the ratio may be lower e.g. at least 30:1, at least 50:1, optionally no more than 100:1 and optionally no more than 150:1, based on the total amount of chain transfer agent comprising an aldehyde or ketone and the total amount of multifunctional monomer.

Substantially all of the chain transfer agent comprising an aldehyde or ketone may be admixed with one or more of at least one monofunctional monomer, at least one multifunctional monomer and optionally at least one polymerisation initiator (if present) at the start of the polymerisation reaction. This may be effective, for example, if the amount of multifunctional monomer is relatively low (for example, no more than 0.1 mol % and optionally no more than 0.05 mol % of the amount of monofunctional monomer), or if the polymerisation reaction is a suspension reaction.

Alternatively, the method may comprise delaying addition of at least some of the chain transfer agent comprising an aldehyde or ketone. The method may comprise delaying addition of at least 50%, optionally at least 60%, optionally at least 70%, optionally at least 80%, optionally at least 90% and optionally substantially all of the chain transfer agent comprising an aldehyde or ketone. The method may therefore comprise having less than 10% (and optionally substantially none) of the chain transfer agent comprising an aldehyde or ketone in the reaction mixture at the commencement of the reaction. The method may comprise providing at least 5%, optionally at least 10% and optionally at least 15% of the chain transfer agent comprising an aldehyde or ketone in admixture with one or more of at least one monofunctional monomer, at least one multifunctional monomer and optionally at least one polymerisation initiator (if present) before the start of the polymerisation reaction. The delayed addition of said chain transfer agent may take place continuously or discontinuously (for example, as a series of discrete portions). The method may comprise adding at least 50%, optionally at least 60% and optionally at least 70% of said chain transfer agent comprising an aldehyde or ketone in a period of up to 4 hours, optionally up to 3 hours, optionally up to 2 hours and optionally in a period of up to 1 hour after commencement of the polymerisation reaction. The method may comprise adding at least 50%, optionally at least 60%, optionally at least 70%, optionally at least 80%, optionally at least 90% of said chain transfer agent comprising an aldehyde or ketone when the percentage conversion of monounsaturated monomers is no more than 70%.

It has been found that it may be advantageous to make the delayed addition in a relatively short period of time after commencement of the polymerisation reaction. The method may comprise adding at least 50%, optionally at least 60%, optionally at least 70%, optionally at least 80%, optionally at least 90% and optionally substantially all of said chain transfer agent comprising an aldehyde or ketone before the conversion % of the monofunctional monomer reaches 60%, optionally 40%, optionally 30% and optionally 20%.

Each monofunctional monomer comprises one (and only one) polymerisable carbon-carbon double bond per molecule. The carbon-carbon double bond will undergo an addition polymerisation reaction to form a polymer.

At least one monofunctional monomer may comprise other unsaturated groups, for example, such as a C=O double bond.

Each monofunctional monomer may comprise any monomer which can be polymerised by a free radical mechanism.

The term "monomer" also includes suitably reactive oligomers (typically comprising fewer than 5 repeat units), or polymers (typically comprising 5 or more repeat units).

The polymerisable carbon-carbon double bond of at least one (and optionally each) monofunctional monomer may be in the form of an ethylenic carbon-carbon double bond.

At least one (and optionally each) monofunctional monomer may comprise from 1 to 20 carbon atoms, for example, but may optionally comprise more than 20 carbon atoms. Optionally, the monofunctional monomer may comprise from 1 to 10, optionally from 2 to 8 and optionally from 3 to 6 carbon atoms.

The molecular mass of at least one (and optionally each) monofunctional monomer may, for example, be less than 2000, optionally less than 1500, optionally less than 1000, optionally less than 500 and optionally less than 200 g·mol$^{-1}$.

At least one monofunctional monomer may, for example, be an ester (such as an alkenyl alkanoate [for example, vinyl acetate]). At least one monofunctional monomer may optionally be substituted. At least one monofunctional monomer may optionally comprise an optionally substituted alkenyl alkanoate.

As indicated above, the method may comprise providing at least one (and therefore, potentially more than one) monofunctional monomer.

Therefore, a second monofunctional monomer may be present. One or both of the first and second monofunctional monomers may, for example, be an ester (such as an alkenyl alkanoate [for example, vinyl propionate] or an alkyl alkenoate [such as methyl acrylate]), an amide (such as acrylamide), an acid anhydride (such as maleic anhydride), an acid (such as itaconic acid), an imide (such as a maleimide) or an alkene (such as ethylene). The second monofunctional monomer may optionally be substituted. The second monofunctional monomer may optionally comprise an optionally substituted alkenyl alkanoate or an optionally substituted alkyl alkenoate. The alkenyl alkanoate, if present, optionally comprises from 3 to 10 carbon atoms, optionally from 3 to 6 carbon atoms. The alkyl alkenoate, if present, optionally comprises from 3 to 10 carbon atoms, optionally from 3 to 6 carbon atoms.

At least one monofunctional monomer may comprise reactive moieties for subsequent reaction once a polymer has been synthesised. For example, at least one monofunctional monomer may comprise one or more ester moieties which may be hydrolysed to form hydroxyl or acid groups.

The C=C double bond of at least one monofunctional monomer may be incorporated in an acyclic moiety. Alternatively, at least one monofunctional monomer may comprise one or more cyclic moieties, with the C=C double bond being incorporated into the cyclic moiety, such as in maleic anhydride.

Further examples of suitable monofunctional monomers include methyl vinyl acetate, propenyl acetate, methyl propenyl acetate, ethyl propenyl acetate, butenyl acetate, methyl butenyl acetate, vinyl propanoate, propenyl propanoate, vinyl benzoate, vinyl 4-t-butylbenzoate, vinyl chloroformate, vinyl cinnamate, vinyl decanoate, vinyl neodecanoate, vinyl propionoate, vinyl butyrate, vinyl pivalate, vinyl hexanoate, vinyl heptanoate, vinyl octanoate, vinyl 2-propylheptanoate, vinyl nonanoate, vinyl neononanoate, vinyl stearate, vinyl trifluoroacetate and vinyl valerate.

Examples of suitable monofunctional monomers include: ethylene, esters of monoethylenically unsaturated C3-C6 monocarboxylic acids with C1-C20 alkanols, cycloalkanols, phenyl-C1-C4 alkanols or phenoxy-C1-C4 alkanols, more particularly the aforementioned esters of acrylic acid and also the aforementioned esters of methacrylic acid; diesters of monoethylenically unsaturated C4-C6 dicarboxylic acids with C1-C20 alkanols, cycloalkanols, phenyl-C1-C4 alkanols or phenoxy-C1-C4 alkanols, more particularly the aforementioned esters of maleic acid and esters of fumaric acid; amides of monoethylenically unsaturated C3-C6-monocarboxylic acids with C4-C20-alkylamines or di-C2-C20-alkylamines; vinyl, allyl, and methallyl esters of saturated aliphatic carboxylic acids, in particular of saturated aliphatic C2-C18 monocarboxylic acids, especially the vinyl esters. Examples of esters of monoethylenically unsaturated C3-C6 monocarboxylic acids with C1-C20 alkanols, cycloalkanols, phenyl-C1-C4 alkanols or phenoxy-C1-C4 alkanols are, in particular, the esters of acrylic acid such as methyl acrylate, ethyl acrylate, n-propyl acrylate, isopropyl acrylate, n-butyl acrylate, 2-butyl acrylate, isobutyl acrylate, tert-butyl acrylate, n-hexyl acrylate, 2-ethylhexyl acrylate, 3-propylheptyl acrylate, decyl acrylate, lauryl acrylate, stearyl acrylate, cyclohexyl acrylate, benzyl acrylate, 2-phenylethyl acrylate, 1-phenylethyl acrylate, 2-phenoxyethyl acrylate, and also the esters of methacrylic acid such as methyl methacrylate, ethyl methacrylate, n-propyl methacrylate, isopropyl methacrylate, n-butyl methacrylate, 2-butyl methacrylate, isobutyl methacrylate, tert-butyl methacrylate, n-hexyl methacrylate, 2-ethylhexyl methacrylate, decyl methacrylate, lauryl methacrylate, stearyl methacrylate, cyclohexyl methacrylate, benzyl methacrylate, 2-phenylethyl methacrylate, 1-phenylethyl methacrylate, and 2-phenoxyethyl methacrylate. Examples of diesters of monoethylenically unsaturated C4-C6 dicarboxylic acids with C1-C20 alkanols, cycloalkanols, phenyl-C1-C4 alkanols or phenoxy-C1-C4 alkanols are, in particular, the diesters of maleic acid and the diesters of fumaric acid, more particularly di-C1-C20 alkyl maleinates and di-C1-C20 alkyl fumarates such as dimethyl maleinate, diethyl maleinate, di-n-butyl maleinate, dimethyl fumarate, diethyl fumarate, and di-n-butyl fumarate. Examples of vinyl, allyl, and methallyl esters of saturated aliphatic carboxylic acid include in particular the vinyl esters of C2-C18 monocarboxylic acids such as vinyl acetate, vinyl propionate, vinyl butyrate, vinyl pivalate, vinyl hexanoate, vinyl-2-ethylhexanoate, vinyl laurate, and vinyl stearate, and also the corresponding allyl and methallyl esters. Further monomers include the esters of monoethylenically unsaturated C3-C6 monocarboxylic acids, more particularly the esters of acrylic acid or of methacrylic acid, with C1-C20 alkanols, cycloalkanols, phenyl-C1-C4 alkanols or phenoxy-C1-C4 alkanols, diesters of monoethylenically unsaturated C4-C6 dicarboxylic acids with C1-C20 alkanols, cycloalkanols, phenyl-C1-C4 alkanols or phenoxy-C1-C4 alkanols are preferred.

Further examples of suitable monofunctional monomers include the esters of monoethylenically unsaturated C3-C6 monocarboxylic acids, more particularly the esters of acrylic acid or of methacrylic acid, with C1-C20 alkanols optionally preferred.

Further examples of suitable monofunctional monomers include the esters of acrylic acid with C2-C10 alkanols (such as C2-C10 alkyl acrylates), the esters of methacrylic acid with C1-C10 alkanols (such as C1-C10 alkyl methacrylates) may be preferred.

Further examples of suitable monofunctional monomers include monoethylenically unsaturated C3-C8 monocarboxylic acids, such as acrylic acid, methacrylic acid, 2-butenoic acid, 3-butenoic acid, 2-acryloxyethylacetic acid and 2-methacryloxyethylacetic acid;—monoethylenically unsaturated C4-C8 monocarboxylic acids, such as maleic acid, itaconic acid and fumaric acid; the primary amides of the aforementioned monoethylenically unsaturated C3-C8 monocarboxylic acids, more particularly acrylamide and methacrylamide, the cyclic amides of the aforementioned monoethylenically unsaturated C3-C8 monocarboxylic acids with cyclic amines such as pyrrolidine, piperidine, morpholine or piperazine, more particularly N-acryloylmorpholine or N-methacryloylmorpholine, hydroxyalkyl esters of the aforementioned monoethylenically unsaturated C3-C8 monocarboxylic acids, e.g. hydroxyethyl acrylate, hydroxyethyl methacrylate, 2- and 3-hydroxypropyl acrylate, 2- and 3-hydroxypropyl methacrylate, monoesters of the aforementioned monoethylenically unsaturated C3-C8 monocarboxylic and C4-C8-dicarboxylic acids with C2-C4 polyalkylene glycols, more particularly the esters of these carboxylic acids with polyethylene glycol or with alkylpolyethylene glycols, the (alkyl)polyethylene glycol radical typically having a molecular weight in the range from 100 to 5000, in particular 100 to 3000; N-vinyl amides of aliphatic C1-C10 carboxylic acids, and N-vinyl lactams, such as N-vinylformamide, N-vinylacetamide, N-vinylpyrrolidone, and N-vinylcaprolactam. monoethylenically unsaturated sulfonic acids in which the sulfonic acid group is attached to an aliphatic hydrocarbon radical, and esters and salts thereof, such as vinylsulfonic acid, allylsulfonic acid, methallylsulfonic acid, 2-methacrylamido-2-methylpropanesulfonic acid, 2-acrylamidoethanesulfonic acid, 2-acryloyloxyethanesulfonic acid, 2-methacryloyloxyethanesulfonic acid, 3-acryloyloxypropanesulfonic acid, 2,2-ethylhexylaminoethane sulfonic acid and 2-methacryloyloxypropanesulfonic acid, and salts thereof, monoethylenically unsaturated phosphonic acids in which the phosphonic acid group is attached to an aliphatic hydrocarbon radical, and esters and salts thereof, such as vinylphosphonic acid, 2-acrylamido-2-methylpropanephosphonic acid, 2-methacrylamido-2-methylpropanephosphonic acid, 2-acrylamidoethanephosphonic acid, 2-methacrylamidoethanephosphonic acid, 2-acryloyloxyethanephosphonic acid, 2-methacryloyloxyethanephosphonic acid, 3-acryloyloxypropanephosphonic acid and 2-methacryloyloxypropanephosphonic acid, and salts thereof, and monoethylenically unsaturated phosphoric monoesters, more particularly the monoesters of phosphoric acid with hydroxy-C2-C4 alkyl acrylates and hydroxy-C2-C4 alkyl methacrylates, such as, for example, 2-acryloyloxyethyl phosphate, 2-methacryloyloxyethyl phosphate, 3-acryloyloxypropyl phosphate, 3-methacryloyloxypropyl phosphate, 4-acryloyloxybutyl phosphate and 4-methacryloyloxybutyl phosphate, and salts thereof.

Further examples of monofunctional monomers include monoethylenically unsaturated C3-C8 monocarboxylic acids, more particularly acrylic acid and methacrylic acid, the amides of the aforementioned monoethylenically unsaturated C3-C8 monocarboxylic acids, more particularly acrylamide and methacrylamide, and the hydroxyalkyl esters of the aforementioned monoethylenically unsaturated C3-C8 monocarboxylic acids, e.g. hydroxyethyl acrylate, hydroxyethyl methacrylate, 2- and 3-hydroxypropyl acrylate, 2- and 3-hydroxypropyl methacrylate.

Examples of combinations of monofunctional monomers include vinyl acetate and vinyl propionate, vinyl acetate and itaconic acid, vinyl acetate and di(alkyl)maleate, vinyl acetate and ethylene, or vinyl acetate and methyl (meth) acrylate. Said copolymers may be statistical or have a "blocky" distribution of the constituent monofunctional monomer units along the polymer chains.

Each multifunctional monomer may comprise any monomer which can be polymerised by a free radical mechanism. As for the monofunctional monomer(s), the term "monomer" also includes suitably reactive oligomers (typically comprising fewer than 5 repeat units), or polymers (typically comprising 5 or more repeat units).

One or more (and optionally each) of the carbon-carbon double bonds of at least one (and optionally each) multifunctional monomer may be an ethylenic carbon-carbon double bond.

At least one multifunctional monomer optionally comprises at least two (and optionally at least three) polymerisable carbon-carbon double bonds per molecule.

At least one multifunctional monomer may comprise a bifunctional monomer i.e. comprises two, and no more than two, polymerisable C=C double bonds. Examples of suitable bifunctional monomers include di(meth)acrylate or diallyl compounds, such as diacrylates and di(meth)acrylates, such as ethylene glycol di (meth) acrylate, hexanediol di (meth) acrylate, tripropylene glycol di (meth) acrylate, butanediol di (meth) acrylate, neopentyl glycol di (meth) acrylate, diethylene glycol di (meth) acrylate, triethylene glycol di (meth) acrylate, dipropylene glycol di (meth) acrylate and vinyl acrylates, such as allyl (meth) acrylate, butadiene, diallyl succinate, diallyl carbonate, diallyl phthalate and substituted analogues thereof.

For example, at least one multifunctional monomer may be a trifunctional monomer i.e. comprises three, and no more than three, polymerisable C=C double bonds.

Trifunctional monomers include: tripropylene glycol tri (meth) acrylate, trimethylol propane tri (meth)acrylate, pentaerythritol tri (meth)acrylate, 1,3,5-triallyl-1,3,5-triazine-2,4,6(1H,3H,5H)-trione ("TTT"), or diallyl maleate.

At least one multifunctional monomer may comprise a tetrafunctional monomer which comprises four (and only four) polymerisable C=C double bonds. Examples of tetrafunctional monomers are pentaerythritol tetra (meth)acrylate.

At least one multifunctional monomer may comprise a pentafunctional monomer which comprises five (and only five) polymerisable C=C double bonds. Examples of pentafunctional monomers include: glucose penta(meth)acrylate.

At least one and preferably each multifunctional monomer is one which does not undergo hydrolysis/transesterification reactions.

The molecular mass of at least one multifunctional monomer may, for example, be more than 100, optionally more than 200, optionally more than 300, optionally less than 2000, optionally less than 1500, optionally less than 1000 and optionally less than 500 g·mol$^{-1}$.

At least one multifunctional monomer may optionally comprise a cyclic moiety to which are attached groups comprising polymerisable carbon-carbon double bonds. Typically, each polymerisable carbon-carbon double bond will be attached, optionally via a spacer, to mutually different atoms of the cyclic moiety. The cyclic moiety may, for example, comprise a five or six membered ring. For example, the ring may comprise a 1,3,5-triazine-2,4,6-trione moiety or a benzene moiety.

As indicated above, the method may comprise providing more than one multifunctional monomer, each multifunctional monomer comprising more than one polymerisable carbon-carbon double bond. Each multifunctional monomer may comprise the features described above in relation to multifunctional monomers. The method may comprise, for example, providing a first multifunctional monomer and a second multifunctional monomer. Examples of suitable combinations include ethylene glycol di(meth)acrylate and butanediol di(meth)acrylate, ethylene glycol di(meth)acrylate and diallyl maleate, TTT and diallyl maleate, TTT and diallyl succinate, TTT and diallyl carbonate, TTT and butanediol di(meth)acrylate, TTT and ethylene glycol di(meth)acrylate.

The amount of multifunctional monomer may be at least 0.005 mol %, at least 0.05 mol %, at least 0.1 mol %, optionally at least 0.2 mol %, optionally no more than 0.4 mol %, no more than 0.5 mol %, no more than 0.6 mol %, no more than 0.8 mol %, no more than 1 mol %, no more than 2 mol % and optionally no more than 5 mol % of the monofunctional monomer content (typically based on the total content of monofunctional monomers and on the total amount of multifunctional monomers). Optionally, the amount of multifunctional monomer may be from 0.005 to 1 mol %, from 0.05 to 0.8 mol %, from 0.1 to 0.6 mol %, from 0.1 to 0.5 mol %, optionally from 0.1 to 0.4 mol % and optionally from 0.2 to 0.4 mol % of the monofunctional monomer content (typically based on the total content of monofunctional monomers and on the total amount of multifunctional monomers).

The method may comprise performing a solution polymerisation, a bulk polymerisation or a suspension polymerisation.

If the polymerisation reaction is a solution polymerisation reaction, the solvent used in the solution polymerisation may comprise a mixture of a first solvent component having a first chain transfer constant and a second solvent component having a second chain transfer constant, the second chain transfer constant being greater than the first chain transfer constant, optionally at least two times greater, optionally at least three times greater, optionally at least four times greater, optionally at least five times greater and optionally at least six times greater than the first chain transfer constant. This may be of particular use if it is desired or required for the solvent to participate in the chain termination process, for example, to inhibit excessive cross-linking and gelling. Those skilled in the art will realise that the chain transfer constant will depend on the monofunctional monomer(s) being polymerised. For example, for the polymerisation of a vinyl monomer, the solvent may comprise methanol and isopropanol, the isopropanol having a chain transfer constant of about 8 times that of methanol. The second solvent component may comprise at least 1 mol %, at least 3 mol %, at least 5 mol %, at least 8 mol %, at least 10 mol % and optionally at least 15 mol % of the first solvent component content. The second solvent component may comprise no more than 10 mol %, no more than 15 mol %, no more than 20 mol %, no more than 25 mol % and optionally no more than 30 mol % of the first solvent component content.

The polymerisation may take place between 0° C. and 25° C. using a redox system for example, more typically it takes place at an elevated temperature, typically at least 30° C., at least 40° C., at least 50° C., at least 60° C., at least 65° C., at least 70° C., optionally at no more than 100° C., no more than 90° C. and optionally no more than 80° C. under atmospheric pressure. Those skilled in the art will understand that these values can be elevated if the reaction is carried out under pressure.

The method may comprise delaying addition of at least some of at least one or more of at least one monofunctional monomer, at least one initiator (if present) and at least one multifunctional monomer. The method may comprise delaying addition of at least some of the at least one monofunctional monomer i.e. at least some of the monofunctional monomer is not present in the reaction mixture at commencement of the reaction. The method may comprise delaying addition of up to 5%, optionally up to 10%, optionally up to 20% and optionally up to 50% of the monofunctional monomer.

The method may comprise providing at least one initiator. Such initiators are capable of generating free radicals. The initiator may, for example, comprise an azo initiator, such as azobis (isobutyronitrile) (AIBN), azobis (2-methylbutyronitrile) (AIVN), azobis (2,4-dimethylvaleronitrile), azobis (4-cyanovaleric acid) or a peroxide, such as hydrogen peroxide, t-butyl hydroperoxide, dilauroyl peroxide, tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate or a persulfate such as ammonium persulfate, sodium persulfate, potassium persulfate. The initiator may comprise a redox initiator, a photoinitiator or an oil-soluble initiator.

Examples of redox initiators may be found in US2007/0184732, in particular in paragraph [0043].

Examples of photoinitiator systems may be found in U.S. Pat. No. 8,603,730, in particular in the text bridging cols. 6 and 7.

Further examples of initiators, in particular oil-soluble initiators, may be found in US209/0258953, in particular in paragraphs [0026] to [0028].

The method may comprise having less than 10% (and optionally substantially none) of the initiator in the reaction mixture at the commencement of the reaction. The method may comprise providing at least 5%, optionally at least 10% and optionally at least 15% of the initiator in admixture with one or more of at least one monofunctional monomer, at least one multifunctional monomer and said chain transfer agent before the start of the polymerisation reaction. The delayed addition of the initiator may take place continuously or discontinuously (for example, as a series of discrete portions). The method may comprise adding at least 50%, optionally at least 60% and optionally at least 70% of said initiator in a period of up to 4 hours, optionally up to 3 hours, optionally up to 2 hours and optionally in a period of up to 1 hour after commencement of the polymerisation reaction. The method may comprise adding at least 50%, optionally at least 60%, optionally at least 70%, optionally at least 80%, optionally at least 90% of the initiator when the percentage conversion of monounsaturated monomers is no more than 70%.

It has been found that it may be advantageous to make the delayed addition in a relatively short period of time after commencement of the polymerisation reaction. The method may comprise adding at least 50%, optionally at least 60%, optionally at least 70%, optionally at least 80%, optionally at least 90% and optionally substantially all of the initiator before the conversion % of the monofunctional monomer reaches 60%, optionally 40%, optionally 30% and optionally 20%.

The method may comprise having less than 10% (and optionally substantially none) of the at least one monofunctional monomer in the reaction mixture at the commencement of the reaction. The method may comprise providing at least 5%, optionally at least 10% and optionally at least 15% of the at least one monofunctional monomer in admixture with one or more of the initiator (if present), at least one multifunctional monomer and said chain transfer agent before the start of the polymerisation reaction. The delayed addition of the at least one monofunctional monomer may take place continuously or discontinuously (for example, as a series of discrete portions). The method may comprise adding at least 50%, optionally at least 60% and optionally at least 70% of said at least one monofunctional monomer in a period of up to 4 hours, optionally up to 3 hours, optionally up to 2 hours and optionally in a period of up to 1 hour after commencement of the polymerisation reaction.

The method may comprise having less than 10% (and optionally substantially none) of the at least one multifunctional monomer in the reaction mixture at the commencement of the reaction. The method may comprise providing at least 5%, optionally at least 10% and optionally at least 15% of the at least one multifunctional monomer in admixture with one or more of at least one monofunctional monomer, initiator (if present) and said chain transfer agent before the start of the polymerisation reaction. The delayed addition of the at least one multifunctional monomer may take place continuously or discontinuously (for example, as a series of discrete portions). The method may comprise adding at least 50%, optionally at least 60% and optionally at least 70% of the at least one multifunctional monomer in a period of up to 4 hours, optionally up to 3 hours, optionally up to 2 hours and optionally in a period of up to 1 hour after commencement of the polymerisation reaction. The method may comprise adding at least 50%, optionally at least 60%, optionally at least 70%, optionally at least 80%, optionally at least 90% of the multifunctional monomer when the percentage conversion of monounsaturated monomers is no more than 70%.

It has been found that it may be advantageous to make the delayed addition in a relatively short period of time after commencement of the polymerisation reaction. The method may comprise adding at least 50%, optionally at least 60%, optionally at least 70%, optionally at least 80%, optionally at least 90% and optionally substantially all of the at least one multifunctional monomer before the conversion % of the monofunctional monomer reaches 60%, optionally 40%, optionally 30% and optionally 20%.

The % conversion of the monofunctional monomer may be at least 70%, optionally at least 80% and optionally at least 90%.

Hydrolysis may be performed by any suitable method known to those skilled in the art and may be controlled to reach a desired degree of hydrolysis, optionally at least 60 mol %, optionally at least 65 mol %, optionally at least 70 mol %, optionally no more than 98 mol %, optionally no more than 95 mol % and optionally no more than 90 mol %. Optionally, the degree of hydrolysis is from 65% to 95 mol % and optionally from 70% to 90 mol %.

Within this application the term "hydrolysis" is understood in its broadest sense and includes base catalysed hydrolysis, saponification, acidolysis, and transesterification. Further guidance in relation to hydrolysis may be found in "Polyvinyl alcohol developments", Edited by C. A. Finch, (C) 1992 John Wiley & Sons Ltd, Chapter 3:Hydrolysis of Polyvinyl Acetate to Polyvinyl Alcohol, by F. L. Marten; C. W. Zvanut, p 57-77.

The polymer formed prior to hydrolysis may comprise a poly (alkenyl alkanoate), such as a poly(vinyl acetate). The polymer formed after hydrolysis may comprise a poly (alkenyl alcohol)-co-poly(alkenyl alkanoate), such as a poly (vinyl alcohol)-co-poly(vinyl acetate).

In accordance with a second aspect of the present invention, there is provided a branched polymer makeable in accordance with the method of the first aspect of the present invention.

In accordance with a third aspect of the present invention, there is provided a branched polymer comprising (C=C)—(C=C)—C=O moieties, the polymer comprising residues of:
(i) At least one monofunctional monomer having one polymerisable double bond per molecule;
(ii) At least one multifunctional monomer having at least two polymerisable double bonds per molecule; and
(iii) at least one chain transfer agent comprising an aldehyde or ketone.

The (C=C)—(C=C)—CO groups are formed at the end of chains by virtue of the use of the carbonyl-containing chain transfer agent.

The polymer may optionally comprise residues of one or more of:
One or more solvent components, one or more initiator, and a second chain transfer agent. The second chain transfer agent may, for example, be used to introduce certain functionalities into the polymer, as described in relation to the method of the first aspect of the present invention.

The polymer may, of course, comprise residues of more than one monofunctional monomer, and/or more than one multifunctional monomer.

The polymer optionally comprises amounts of the various components mentioned above as set-out in relation to the method of the first aspect of the present invention. For example, the polymer may comprise at least 0.5 mol %, at least 1 mol %, at least 5 mol %, at least 10 mol %, no more than 20 mol %, no more than 25 mol %, no more than 30 mol % and optionally no more than 50 mol % of residues of chain transfer agent comprising an aldehyde or ketone, based on the total number of moles of residues of monofunctional monomer and the total number of moles of residues of chain transfer agents comprising an aldehyde or ketone.

Those skilled in the art will realise that the residues may be post-treated. For example, the polymer may comprise residues of vinyl acetate in the form of acetate groups attached to a polymer backbone. These acetate groups may be hydrolysed to form hydroxyl groups. Furthermore, the polymer may comprise residues of dialkyl maleate in the form of alkanol groups attached to a polymer backbone. These alkanol groups may be hydrolysed to form carboxylic acid groups.

The polymer may be hyperbranched. Within this application the term "hyperbranching" is understood in its broadest sense and is used consistent with Pure Appl. Chem., Vol. 81, No. 6, pp. 1131-1186, 2009. doi:10.1351/PAC-REC-08-01-30 © 2009 IUPAC, Publication date (Web): 5 May 2009; International Union of Pure and Applied Chemistry Polymer Division; Commission on macromolecular nomenclature; subcommittee on macromolecular terminology and subcommittee on polymer terminology glossary of class names of polymers based on chemical structure and molecular architecture In its broadest terms, hyperbranching refers to a polymer composed of highly branched macromolecules in which any linear subchain may lead in either direction to at least two other subchains.

The polymer may be a poly(alkenyl alkanoate) or a poly (alkenyl alcohol)-co-poly(alkenyl alkanoate) or a poly(alkyl alcohol)-co-poly (alkyl alkenoate). The polymer may therefore comprise ester groups, carboxylic acid groups and hydroxyl groups, for example. The polymer may have a degree of hydrolysis of at least 60 mol %, optionally at least 65 mol %, optionally at least 70 mol %, optionally no more than 95 mol % and optionally no more than 90 mol %. This relatively high degree of hydrolysis has been found to be effective in promoting good behaviour as a primary suspending agent in certain polymerisation reactions, such as the polymerisation of alkenyl compounds, such as vinyl chloride and its copolymers.

The polymer may optionally have a weight averaged molecular weight ($M_w$) of at least 3,000, optionally at least 10,000, optionally at least 20,000, optionally at least 40,000 and optionally at least 50,000. The polymer may optionally have a weight averaged molecular weight ($M_w$) of no more than 60,000, optionally no more than 70,000, optionally no more than 80,000, optionally no more than 100,000, optionally no more than 200,000, optionally no more than 300,000, optionally no more than 400,000, optionally no more than 500,000, optionally no more than 750,000 and no more than 1,000,000 g·mol$^{-1}$.

The polymer may optionally have a number averaged molecular weight ($M_n$) of at least 1,500, optionally at least 2,000, optionally at least 2,500, optionally at least 3,000 and optionally at least 4,000. The polymer may optionally have a number averaged molecular weight ($M_n$) of no more than 6,000, optionally no more than 7,000, optionally no more than 8,000, optionally no more than 10,000, optionally no more than 12,000, optionally no more than 15,000, optionally no more than 25,000, optionally no more than 30,000, optionally no more than 50,000, optionally no more than 100,000, optionally no more than 200,000, optionally no more than 300,000, optionally no more than 400,000 and optionally no more than 500,000 g·mol$^{-1}$.

$M_w$ and $M_n$ were measured by size exclusion chromatography (SEC) (also known as gel permeation chromatography, GPC) in THF solution. The sample was injected into a PL-GPC-50 system via autosampler, using stabilised THF as a mobile phase and three PL gel columns in series, each column having dimensions of 300 mm×7.5 mm×10 μm. The system was calibrated with PS High Easivials® polystyrene standards in the Mp molecular weight range of 6,035,000-580 g·mol$^{-1}$ (supplied by Agilent Technologies).

The dispersity (defined as $M_w/M_n$, often known as a polydispersity, or polydispersity index (PDI)) of the polymer may be at least 2, at least 3, at least 5 and optionally at least 10. The dispersity may optionally be no more than 20, optionally no more than 25, optionally no more than 30, optionally no more than 50, optionally no more than 100, optionally no more than 150 and optionally no more than 200. Optionally, the dispersity of the polymer may be from 3 to 200, optionally from 5 to 150, optionally from 3 to 30 and optionally from 5 to 25.

The viscosity of a 4% (w/w) solution of the hydrolysed polymer at 20° C., typically a poly (vinyl acetate)-co-poly (vinyl alcohol), may be no more than 50 mPa·s, optionally no more than 30 mPa·s, optionally no more than 20 mPa·s, optionally no more than 10 mPaS, optionally no more than 8 mPa·s and optionally no more than 5 mPas. Optionally, the viscosity is at least 1 mPa·s, optionally at least 2 mPa·s and optionally at least 5 mPa·s.

The viscosity of 4% (w/w) solution mentioned above was measured by dissolving dried material in distilled water to give the desired concentration, placing the required quantity of solution in to a calibrated U-tube viscometer (the capillary size of which was chosen to give a flow time of approximately 60 seconds), equilibrated at 20±0.2° C. in a water bath. The time for the equilibrated solution to flow between 2 marks on the capillary is used to calculate the solution viscosity. The solution viscosity was calculated thus:

viscosity=(recorded flow time)×(density of the 4% (w/w) solution)×(calibration factor for the viscometer).

Solution viscosity measurements on poly(alkenyl alkanoates), such as poly(vinyl acetate) were made to determine the K-value. In this case, the K-value measurements were performed using a 2% (w/v) solution of the polymer in ethyl acetate in a "C" U-tube viscometer equilibrated at 20±0.2° C. in a water bath. The time for the equilibrated solution to flow between 2 marks on the capillary is used to calculate the relative solution viscosity.

The relative solution viscosity=(recorded flow time of the 2% (w/v)solution)/(recorded flow time of ethyl acetate).

The K-value may be at least 10, at least 15, at least 20 and optionally at least 25. The K-value may optionally be no more than 40, no more than 50, no more than 60, no more than 70, no more than 80 and optionally no more than 100. The K-value may be from 20 to 70, optionally from 25 to 70, optionally from 25 to 60 and optionally from 30 to 60.

The polymer of the present invention optionally comprises more C=C—C=C—C=O moieties than (C=C)$_3$CO moieties, optionally significantly more. The intensity of the UV absorbance peak at 280 nm (attributed to the C=C—C=C—C=O moiety) generated by a solution of the polymer may optionally be greater than the intensity of the UV absorbance peak at 320 nm (attributed to the (C=C)$_3$CO moiety), the peak at 280 nm optionally having at least two times the intensity, optionally at least three times the intensity, optionally at least four times the intensity, optionally at least 5 times, and optionally at least 6 times the intensity of the peak at 320 nm. Those skilled in the art will realise that the precise wavelengths at which the peaks are observed may vary slightly from 280 nm and 320 nm.

For the avoidance of doubt the intensity of the UV absorbance peaks were measured thus. A solution or dispersion of the polymer was formed in distilled water, typically at a concentration of 0.1% or 0.2% (w/w). The UV spectrum of the solution is then recorded on a UV single beam spectrometer (Thermo Spectronic), using a 10 mm light path quartz cell, the spectrum being corrected for the solvent/dispersant (water). The absorbance is multiplied by a suitable number (typically 10 or 5, depending on the initial concentration used) to provide an absorbance at 1% (w/w) concentration of polymer.

Those skilled in the art will realise that the polymer of the third aspect of the present invention may incorporate the features described with reference to the method of the first aspect of the present invention. Furthermore, the method of the first aspect of the present invention may incorporate the features of the polymer of the third aspect of the present invention, and the method of the first aspect of the present invention may be used to make a polymer of the third aspect of the present invention.

In accordance with a fourth aspect of the present invention, there is provided a use of a polymer in accordance with the second or third aspect of the present invention in a suspension polymerisation of an unsaturated monomer. The polymer is optionally used as a primary suspending agent. Primary suspending agents are typically used to control particle size and to control the coagulation of particles.

In accordance with a fifth aspect of the present invention, there is provided a suspension polymerisation reaction composition comprising a continuous phase in which is dispersed liquid beads of monomer to be polymerised, and a polymer in accordance with the second or third aspect of the present invention.

Typically a primary suspending agent is used at a level of 400 ppm and 1500 ppm, optionally in combination with 0-2000 ppm of a secondary suspending agent, the exact values being dependent upon the reactor geometry, agitation, oxygen level, additives (such as buffer, temperature, presence of reflux condensers etc. In addition, a primary suspending agent may comprise more than one component; for example, it may comprise a 72 mol % hydrolysed PVOH in combination with an 88 mol % hydrolysed PVOH, optionally in combination with an 88 mol % hydrolysed PVOH, optionally in the presence of a cellulosic primary suspending agent. Similarly, a secondary suspending agent may be a low hydrolysis polyvinyl acetate (typically less than 60 mol %), a cellulosic material or a non-ionic surfactant such as sorbitan monolaurate, or a combination thereof, for example. The continuous phase may be aqueous. The monomer may comprise an alkenyl compound, such as vinyl chloride, and its copolymers. The terms "primary suspending agent" and "secondary suspending agent" are well-known to those skilled in the art. A primary suspending agent typically controls coalescence of the polymer particles, and therefore primarily dictates the size of the polymer particles so formed. A secondary suspending agent typically defines secondary characteristics of the polymer particles, such as particle shape and porosity. Such secondary suspending agents typically comprise partially hydrolysed polyvinyl acetates (with a typical degree of hydrolysis of about 55 mol %).

Embodiments of the present invention will now be described by way of example only

DETAILED DESCRIPTION

In the description below, the following abbreviations or terms are used:
IPA—isopropyl alcohol (2-propanol)
TTT—1,3,5-triallyl-1,3,5-triazine-2,4,6-trione
$M_n$—number average molecular weight
$M_w$—weight average molecular weight
PDI—$M_w/M_n$
K—K-value
RA—Residual acetate (% (w/w))
DH—Degree of hydrolysis (mol %)
MeOH—methanol
VAc—vinyl acetate
AIBN—azobisisobutyronitrile
AIVN—azobis(2-methylbutyronitrile)
'BP2EH—t-butyl peroxy-2-Ethylhexanoate
CTA—chain transfer agent
4-L/SP—4 litre volume reactor
1-L/SP—1 litre volume reactor
$UV_{280}$—intensity of the UV adsorption peak at 280 nm expressed at 1% (w/w) concentration
$UV_{320}$—intensity of the UV adsorption peak at 320 nm expressed at 1% (w/w) concentration
DH—degree of hydrolysis (mol %)—the degree of hydrolysis is calculated from the Residual acetate (RA) value. The Residual acetate value for the polymer is measured by refluxing with a known excess of 0.1N sodium hydroxide solution. A blank determination with no polymer is also carried out. The remaining sodium hydroxide is titrated against 0.1N hydrochloric acid using phenol phthalein indicator. The residual acetate in the polymer is calculated using the formula below.

$$\text{Residual Acetate}(\%(w/w)) = \frac{(V_{blank} - V_{Titre}) \times 0.86}{\text{Weight of sample}}$$

$$\text{Degree of hydrolysis(mol \%)} = 100 \times \frac{1.9545(100 - RA)}{[1.9545(100 - RA)] - RA}$$

4% (w/w) viscosity—the viscosity of a 4% (w/w) solution of a poly(vinyl alcohol)-co-poly(vinyl acetate) was measured as described above.
TSC—Total solid content. The percentage total solids content (TSC) is determined by weighing a sample of material before and after drying in a vacuum oven, at about −900 to −1000 mbar and 105° C., for one hour.
MH—Mark-Houwink constant This was generated by the SEC software, data collection was using Cirrus® Multi Online GPC/SEC Version 3.2 supplied by Varian Inc. The data analysis was made using Cirrus® Multi Offline GPC/SEC Version 3.2 supplied by Varian Inc.

The Mark-Houwink equation is used to describe the relationship between the intrinsic viscosity of a polymer and its relative molecular mass:

$$[\eta] = K \cdot M_r^a$$

Where
$[\eta]$=intrinsic viscosity, and K and 'a' are constants (often called Mark-Houwink constants) which depend upon the nature of the polymer and the solvent, as well as on temperature and is usually one of the relative molecular mass averages (http://goldbook.iupac.org/M03706.html). For a given polymer (and equivalent degree of hydrolysis) in the same solvent at the same temperature and concentration, K will be constant and only the exponential term "a" will reflect the linear or branched nature of the polymer. It is widely accepted that under these circumstances a decrease in the value of a indicates an increase in the degree of branching/hyperbranching.

$D_{50}$—this is a measure of grain size of the PVC and is determined thus. 12.5 g of resin is weighed and placed on a stack of six sieves having openings of 315, 250, 200, 160, 100 and 75 microns respectively, and a collecting pan for collecting anything that passes through the 75 micron sieve. The stack is secured to a vibrator and shaken for 15 minutes. The mass of resin in each sieve is recorded and each value divided by 12.5 to give a measure of the fraction of the total mass caught by that sieve. The values are plotted on a logarithmic graph and the value at which 50% of the mass is reached is determined.

GSD—grain size distribution. GSD is determined by using the graph obtained for the $D_{50}$ grain size measurement to determine the grain size at which 16% of the mass of the resin is reached, and the grain size at which 84% of the mass of the resin is reached. The GSD is then calculated by halving the difference between the grain size at which 84% of the mass is reached and the grain size at which 16% of the mass is reached and dividing that result by $D_{50}$.

BD—bulk density. A quantity of resin is placed in a fluid bed dryer and dried at 50° C. for an hour. The resin is cooled for an hour. The resin is then poured through a funnel into a stainless steel container of precisely 100 cm³, conforming to ASTM 1895B. A sharp blade is used to level the resin mound, and the container weighed. The BD (bulk density) is calculated from the mass and volume of the resin in the container.

CPA—the CPA (cold plasticiser absorption) of the PVC may be determined by carefully weighing 2.5 g of the resin and 4 g dioctyl phthalate (a plasticiser) into a vessel containing a membrane. The vessel is jacketed and centrifuged at 3000 rpm for an hour (to give same value as the ASTM standard). The vessel is reweighed to determine the mass of plasticiser that has been adsorbed by the resin. A percentage figure relative to the mass of the resin can be calculated.

PF—the packing fraction of the PVC is a measure of how well the grains of resin pack together. It is calculated thus:

$$PF = \frac{(1 + 0.014 \, CPA)(0.1 \, BD)}{1.4}$$

Before testing, all samples of resin were washed twice with 1% (w/w) sodium lauryl sulphate and dried overnight in an oven at 50° C. The resin is then weighed, placed in the oven for a further hour and then re-weighed. Only when the mass no longer decreases by more than 1.0 g is it considered dry enough for testing.

The present invention will now be described by way of example only.

All materials were used as supplied without further purification. All materials were obtained from Aldrich apart from AIBN (from Pergan GmbH), IPA (from Fisher Scientific), methanol (from Brenntag GmbH or Mitsui & Co. Europe PLC) and VAc (from Brenntag GmbH or Lyondell-Basell Industries N.V.). Examples of the method of the present invention were performed by solution polymerisation and suspension polymerisation. Firstly, examples of the method of the present invention using solution polymerisation will be described A—General Method Used for the Production of PVAc Using Solution Polymerisation The monofunctional monomer (typically vinyl acetate), multifunctional monomer (in this case, TTT), initiator (typically AIBN), solvent (methanol and/or IPA) and CTA (typically propanal) were mixed in a reactor flask (typically a 1 litre flask) and deoxygenated with nitrogen for 30 minutes. The mixture was then heated to a reaction temperature (typically 70° C.). If further components are to be added (such as CTA), they are typically added over the following hour (although this period may be longer than an hour). The reaction was then held at the reaction temperature for a further 4 hours (making a total of 5 hours at the reaction temperature). Excess liquid was then removed by distillation, with a constant feed of methanol being added for 4 hours to maintain workable viscosities.

B—Production of PVOH from PVAc

The PVAc made by the method generally described above in "A" was hydrolysed using a 45% (w/w) solution of the PVAc in methanol. Typically, 14 mL of catalyst (10% (w/w) NaOH in methanol) was used per 100 g of polymer. Sometimes it is necessary to use larger amounts of catalyst (e.g. up to 20 mL of catalyst (10% (w/w) NaOH in methanol) per 100 g of polymer). Hydrolysis of PVAc to PVOH using a solution of sodium hydroxide (NaOH) is well-known to those skilled in the art for example GB749458, and it is described in "Polyvinyl alcohol developments", Edited by C. A. Finch, (C) 1992 John Wiley & Sons Ltd, Chapter 3: Hydrolysis of Polyvinyl Acetate to Polyvinyl Alcohol, by F. L. Marten; C. W. Zvanut, p 57-77. The claims of the present application may incorporate any of the features disclosed in those documents. In particular, the claims of the present application may be amended to include features relating to the hydrolysis of the ester monomer residues on the polymer chain described in these documents.

For the avoidance of doubt the use of the description polyvinyl alcohol also encompasses poly(vinyl alcohol) and partially hydrolysed poly(vinyl acetate) and partially hydrolysed polyvinyl acetate and PVOH.

For the avoidance of doubt the use of the description polyvinyl acetate also encompasses poly(vinyl acetate) and PVAc.

Examples of polyvinyl acetate polymers made using the general method described above in "A" are now described with reference to Table 1. Examples labelled "C. Ex" are comparative examples, and are not within the scope of the present invention.

The solvent was IPA and/or methanol. The CTA was propanal, all of which was initially present in the reaction mixture i.e. no delayed addition of the CTA. The reaction time was 5 hours and the reaction temperature was 70° C.

The Examples above illustrate that satisfactory conversion levels could be obtained, but that appreciable levels of IPA were needed in order to inhibit gelling, given the amounts of CTA and TTT present in the reaction mixture.

TABLE 1

| Example No. | $m_{IPA}$ (g) | $m_{MeOH}$ (g) | TTT:VAc (mol:mol), % | Propanal:VAc (mol:mol), % | Conversion. (%) | K-value | $M_n$ g·mol$^{-1}$ | $M_w$ g·mol$^{-1}$ | PDI |
|---|---|---|---|---|---|---|---|---|---|
| 1 | 150 | 0 | 0.17 | 0.51 | 82 | 14.3 | 3300 | 10500 | 3.2 |
| C. Ex. 1 | 150 | 0 | 0.00 | 0.50 | 82 | 14.0 | 2800 | 9100 | 3.2 |
| 2 | 75 | 75 | 0.17 | 0.51 | 81 | 15.0 | 5200 | 18000 | 3.4 |
| 3 | 52 | 52 | 0.17 | 0.51 | 92 | 26.0 | 11300 | 115000 | 10.2 |
| 4 | 0 | 150 | 0.17 | 0.51 |  |  | Gelled | ND | ND |
| 5 | 38 | 113 | 0.17 | 0.51 | 87 | 28.0 | 125.0 | 118.5 | 9.5 |
| 6 | 26 | 78 | 0.17 | 0.51 |  |  | Gelled | ND | ND |
| 7 | 38 | 66 | 0.17 | 0.51 |  |  | Gelled | ND | ND |
| 8 | 26 | 78 | 0.17 | 0.76 | 89 | 55.1 | — | — |  |
| 9 | 26 | 78 | 0.33 | 1.01 |  |  | Gelled | ND | ND |
| 10 | 52 | 52 | 0.33 | 1.01 |  |  | Gelled | ND | ND |
| 11 | 52 | 52 | 0.33 | 2.03 |  |  | Gelled | ND | ND |
| 12 | 52 | 52 | 0.25 | 1.01 |  |  | Gelled | ND | ND |

ND is not determined, due to gelation

Further examples are now described with reference to Table 2, illustrating that delayed addition of the CTA inhibits gelling.

Investigations were undertaken to determine the characteristics of polyvinyl alcohols made by the method generally described above in "A" and "B". Examples of polyvinyl

TABLE 2

| Example No. | Propanal$_{ini}$ (R) | Propanal$_{del}$ (R) | IPA$_{ini}$ (R) | MeOH$_{ini}$ (R) | MeOH$_{del}$ (R) | TSC (%) | K-value |
|---|---|---|---|---|---|---|---|
| 13 | 1.28 | — | 64.7 | 194 | — | 47.4 | 55 |
| 14 | 1.92 | — | 64.7 | 194 | — | 46.2 | 56 |
| 15 | — | 1.92 | 64.7 | 144 | 50 | Gelled | |
| 16 | 0.96 | 1.92 | 64.7 | 144 | 50 | 44.6 | 58 |
| 17 | 0.96 | 3.84 | 64.7 | 144 | 50 | 44.5 | 53 |
| 18 | 2.88 | 7.68 | 64.7 | 144 | 50 | 45.5 | 45 |
| 19 | 3.46 | 12.0 | 51.8 | 144 | 50 | 41.8 | 31 |
| 20 | 4.04 | 14.0 | 38.8 | 144 | 50 | 45.6 | 40 |
| 21 | 4.04 | 14.0 | 19.4 | 144 | 50 | 39.6 | 53 |
| 22 | 4.85 | 16.8 | — | 164 | 50 | 36.6 | 54 |
| 23 | 4.85 | 16.8 | — | 144 | 50 | Gelled | |
| 24 | 5.82 | 20.2 | — | 164 | 50 | Gelled | |
| 25* | 6.79 | 23.5 | — | 164 | 50 | Gelled | |
| 26 | 6.79 | 23.5 | — | 164 | 50 | 44.4 | 32 |

*No control of propanal feed rate

The polymers of Table 2 were synthesised using the general method described above. IPA$_{ini}$, MeOH$_{ini}$ and Propanal$_{ini}$ refer to the amount of IPA, methanol and propanal initially in the reaction mixture. 248.8 g of VAc, 1.20 g of TTT and 9.5 g of AIBN were also initially present in the reaction mixture. Further propanal (Propanal$_{del}$) was added continuously (along with methanol, labelled MeOH$_{del}$) over a period of an hour after the reaction mixture had been brought up to reaction temperature.

The Examples of Table 2 illustrate that it is possible to obtain polymers which are not gelled, even in the absence of IPA or with little IPA present, by delaying the addition of at least some of the CTA. The Examples of Table 2 illustrate that controlled addition is preferred; in Example 25, the delayed addition of propanal is not controlled and gelling is observed, whereas in Example 26, the delayed addition of propanal is controlled and a gel is not formed. In the Examples above, methanol is a preferred solvent because it has a lower chain transfer constant than IPA, and therefore fewer solvent residues are incorporated into the polymer. This is desirable because it is desired to incorporate more CTA residues to increase the amount of carbonyl groups in the polymer.

alcohols made will now be described with reference to Table 3. Unless stated otherwise, the vinyl acetate polymers of the examples of Table 3 were synthesised at 70° C., with 248.8 g VAc, 1.20 g TTT, 9.5 g AIBN and 6.79 g propanal and 213.9 g MeOH initially present in the reaction mixture, with 23.5 g propanal being added continuously to the reaction mixture over a period of an hour, with the reaction being maintained at the reaction temperature for the further 4 hours after the propanal had been added. The polyvinyl acetates so obtained were then hydrolysed to form polyvinyl alcohols.

TABLE 3

| Example no. | TTT:VAc (mol:mol), % | K-value | DH (mol %) | UV$_{280}$ | UV$_{320}$ | M$_n$ g · mol$^{-1}$ | M$_w$ g · mol$^{-1}$ | PDI | MH |
|---|---|---|---|---|---|---|---|---|---|
| C. Ex. 2 | 0 | 26.0 | 81.0 | 6.50 | 0.75 | 4600 | 12900 | 2.8 | 0.62 |
| | 0 | 32.0 | 75.5 | 4.37 | 0.75 | 6600 | 20400 | 3.1 | 0.64 |
| C. Ex. 3 | | | 78.5 | 4.64 | 0.90 | 5900 | 18700 | 3.2 | 0.66 |
| 27 | 0.10 | 30.0 | 75.4 | 4.86 | 0.85 | 5800 | 37200 | 6.4 | 0.51 |
| | | | 78.7 | 4.90 | 0.75 | 4900 | 33300 | 6.8 | 0.50 |
| 28 | 0.16 | 48.8 | 70.3 | 5.08 | 1.00 | 5900 | 81700 | 13.7 | 0.44 |
| 29 | 0.17 | 34.8 | 71.7 | 5.50 | 1.00 | 8500 | 91800 | 11.0 | 0.41 |
| C. Ex. 4 | 0.17 | 52.0 | 74.0 | 1.05 | 0.80 | 4150 | 104500 | 25.0 | 0.41 |
| | | | 80.0 | 0.85 | 0.75 | 3900 | 91800 | 23.0 | 0.43 |
| 30 | 0.17 | 43.5 | 74.4 | 6.50 | 1.40 | 5300 | 81200 | 16.0 | 0.42 |
| | | | 77.0 | 6.25 | 2.50 | 5000 | 77500 | 15.0 | 0.44 |
| 31 | 0.17 | 31.5 | 75.4 | 6.40 | 0.65 | 5000 | 57800 | 11.5 | 0.43 |
| | | | 81.3 | 6.80 | 1.00 | 4500 | 50800 | 11.2 | 0.45 |
| 32 | 0.20 | 32.0 | 73.5 | 7.60 | 1.75 | 5900 | 71400 | 12.0 | 0.39 |
| 33 | 0.24 | 40.8 | 72.0 | 7.85 | 1.50 | 4700 | 82200 | 17.0 | 0.41 |

C. Ex. 2—No TTT, Propanal$_{ini}$=5.82 g, Propanal$_{del}$=20.6 g
C. Ex 3—No TTT, VAc=300 g, Propanal$_{ini}$=5.82 g, Propanal$_{del}$=20.6 g
Ex. 27-0.7 g TTT
Ex. 28—VAc=265 g, Propanal$_{del}$=25 g
Ex. 29—MeOH$_{ini}$=163.9 g, MeOH$_{del}$=50 g
C. Ex. 4—IPA used instead of propanal, IPA$_{ini}$=24.4 g, IPA$_{del}$=100 g
Ex. 32—MeOH$_{ini}$=163.9 g, TTT=1.45 g, Propanal$_{ini}$=8.5 g, Propanal$_{del}$=24.5 g, MeOH$_{del}$=50 g
Ex. 33—TTT=1.7 g, "aliquot addition" addition of propanal (5.66 g at t=10-20-30-40-50-60 minutes)

The use of the subscript "ini" refers to the amount of a particular component initially present in the reaction mixture. The use of the subscript "del" refers to the amount of component which is subject to a delayed addition.

The parameters listed in Table 3 above were measured for the polyvinyl alcohols, apart from the K-values which were measured for the polyvinyl acetates.

The examples of Table 3 illustrate that it is possible to make polymers with a high TTT concentration by using a correspondingly large amount of CTA, with addition of at least some of that CTA being delayed and controlled. For example, for Example 38, 10.1 g of the propanal was added initially and 43 g then added over a period of about an hour. The examples of Table 3 further illustrate that increasing the amount of TTT increases the intensity of the UV absorption peak at 280 nm, indicating that the concentration of —(C=C)$_2$C=O species increases with amount of TTT used. The intensity of the UV absorption peak at 320 nm does not increase appreciably with the amount of TTT used, indicating that the concentration of the (C=C)$_3$C=O species is not markedly increasing. Furthermore, the small peak observed at 320 nm is consistent with the white colouration of the polymer. The Mark-Houwink constant decreases with an increasing amount of TTT used, indicating that the increase in TTT is leading to a greater amount of branching.

Further experiments were performed to investigate the effect of making the polyvinyl acetate in a 4 litre reactor (as opposed to a 1 litre reactor).

TABLE 4

| Example No. | TTT:VAc (mol:mol), % | CTA:TTT (mol:mol) | Reactor | Conversion (%) | K-value | DH (mol %) | $UV_{280}$ | $UV_{320}$ | 4% (w/w) viscosity (mPa · s) |
|---|---|---|---|---|---|---|---|---|---|
| 34 (rpt. Ex. 30) | 0.17 | 108.4 | 4-L/SP | 84 | 26 | 71.5 | 7.0 | 0.8 | 3.00 |
|  |  |  |  |  |  | 74.9 | 7.8 | 0.8 |  |
|  |  |  |  |  |  | 80.2 | 8.5 | 1.0 |  |
| C. Ex. 5 (rpt. C. Ex. 4) | 0.17 | 430.0 | 4-L/SP | 74 | 44 | 74.8 | 0.6 | 0.4 | 4.27 |
|  |  |  |  |  |  | 77.3 | 0.5 | 0.3 |  |
|  |  |  |  |  |  | 81.5 | 0.4 | 0.2 |  |
| 35 (rpt. Ex. 32) | 0.20 | 96.2 | 4-L/SP | 86 | 28 | 73.5 | 8.4 | 1.0 | 2.87 |
|  |  |  |  |  |  | 75.0 | 9.0 | 1.0 |  |
|  |  |  |  |  |  | 78.2 | 9.1 | 1.0 |  |
|  |  |  |  |  |  | 79.2 | 9.5 | 1.3 |  |
| 36 | 0.24 | 106.1 | 4-L/SP | 86 | 26 | 72.0 | 8.5 | 1.0 | 2.68 |
|  |  |  |  |  |  | 76.4 | 9.1 | 0.8 |  |
|  |  |  |  |  |  | 77.9 | 9.2 | 1.3 |  |
|  |  |  |  |  |  | 80.2 | 9.7 | 1.0 |  |
| 37 | 0.28 | 105.2 | 1-L/SP | 85 | 22 | 72.8 | 8.7 | 1.3 | 2.18 |
|  |  |  |  |  |  | 74.4 | 9.7 | 1.3 |  |
|  |  |  |  |  |  | 83.5 | 8.5 | 1.0 |  |
| 38 | 0.30 | 106.0 | 1-L/SP | 83 | 26 | 74.5 | 12.3 | 1.3 | 2.35 |
|  |  |  |  |  |  | 76.7 | 13.0 | 1.5 |  |
|  |  |  |  |  |  | 79.0 | 14.2 | 1.5 |  |

The polyvinyl acetates were made using the method generally described above in relation to the examples of Table 3. The polyvinyl acetates were then hydrolysed as described above in "B". The intensity of the UV absorption peak at 280 nm increases with the amount of TTT used. The viscosities of the solutions of the polyvinyl alcohols are generally low indicating that the branched character of the polymer is retained after hydrolysis.

Six samples of polymer were submitted for GPC analysis.

TABLE 4A

| Example | $M_n$ | $M_w$ | PDI | MH |
|---|---|---|---|---|
| 35 | 5,200 | 159,100 | 31 | 0.38 |
| 34 | 6,900 | 122,900 | 18 | 0.42 |
| C. Ex. 5 | 6,500 | 380,500 | 59 | 0.43 |
| 36 | 6,000 | 133,000 | 22 | 0.40 |
| 37 | 5,100 | 114,300 | 22 | 0.39 |
| 38 | 5,500 | 337,600 | 61 | 0.42 |

Experiments were performed to determine whether the method described above could be adapted to use other tri-unsaturated monomers, instead of the tri-unsaturated monomer, TTT. Examples of polyvinyl alcohols made using diallyl maleate ("DAM") will now be described with reference to Table 5.

TABLE 5

| Example No. | DAM:VAc (mol:mol), % | CTA:DAM (mol:mol) | Conversion (%) | K-value | DH (mol %) | $UV_{280}$ | $UV_{320}$ | 4% viscosity. (mPa · s) |
|---|---|---|---|---|---|---|---|---|
| 38 | 0.30* | 106.0 | 83 | 26 | 74.5 | 12.3 | 1.3 | 2.35 |
|  |  |  |  |  | 76.7 | 13.0 | 1.5 |  |
|  |  |  |  |  | 79.0 | 14.2 | 1.5 |  |
| 40 | 0.31 | 94.4 |  |  | Gelled |  |  |  |
| 41 | 0.31 | 110.3 |  |  | Micro-gelled |  |  |  |
| 42 | 0.31 | 135.7 | 91 | 30 | 75.4 | 14.2 | 1.0 | 2.20 |
|  |  |  |  |  | 76.6 | 14.7 | 1.0 |  |
|  |  |  |  |  | 79.6 | 14.8 | 1.0 |  |

*Ex. 38 - used TTT, not DAM

The polyvinyl acetates were made using the method generally described above. All reactions were performed at 70° C. with VAc=248.8 g, MeOH=214 g, AIBN=9.5 g and DAM=1.9 g. The CTA (propanal) was added over a period of an hour, and the reaction mixture was then kept at reaction temperature for a further period of 4 hours. The initial charges of propanal added at the start were 10.1 g, 10.1 g and 11.0 g for Examples 40, 41 and 42 respectively. A further amount of propanal (43.0 g, 47.6 g and 60.0 g for Examples 40, 41 and 42 respectively) was added over an hour.

It was observed that a larger amount of propanal is required to avoid gel formation when using DAM than when using TTT. The intensities of the $UV_{280}$ absorption peak is slightly greater for the polymer made using DAM than for the polymer made using TTT, indicating a slightly greater concentration of (C=C)$_2$C=O moieties. The K-value of Ex. 42 (made using DAM) is greater than that of Ex. 38 (made using TTT), but the 4% viscosity measurements are similar, indicating that some branches have probably been cleaved during hydrolysis. The effect of a delayed feed of monofunctional monomer and optionally multifunctional monomer was investigated, the results being shown below in Table 6.

TABLE 6

| Example No. | Temperature (° C.) | Feed (h) | Conversion (%) | K-value | DH (mol %) | $UV_{280}$ | $UV_{320}$ |
|---|---|---|---|---|---|---|---|
| 43 | 60 | 3 | 72 | 31.5 | 71.5 | 7.6 | 1.5 |
| 44 | 65 | 3 | Gelled |  | ND | ND | ND |
| 45 | 65 | 3 | Microgel |  | ND | ND | ND |
| 46 | 70 | 3 | 38 | — | — | — | — |
| 47 | 70 | 2 | 38 | <20.0 | — | — | — |

TABLE 6-continued

| Example No. | Temperature (° C.) | Feed (h) | Conversion (%) | K-value | DH (mol %) | $UV_{280}$ | $UV_{320}$ |
|---|---|---|---|---|---|---|---|
| 48 | 75 | 2 | 81 | 23.0 | * | ND | ND |
| 49 | 70 | 2 | 84 | 22.1 | 72.5 | 5.3 | 0.6 |
|  |  |  |  |  | 73.9 | 7.2 | 1.5 |
|  |  |  |  |  | 79.2 | 7.2 | 1.0 |

ND is not determined

Ex. 43—Initial mixture—MeOH=250 g, $VAc_{ini}$=200 g, TTT=1.2 g, AIBN=9.5 g, $propanal_{ini}$=6.79 g. Delayed addition of propanal=33.8 g and VAc=100 g Ex. 44—Initial mixture—MeOH=250 g, $VAc_{ini}$=200 g, TTT=1.2 g, AIBN=9.5 g and $propanal_{ini}$=6.79 g. Delayed addition of propanal=25 g and VAc=100 g Ex. 45—Initial mixture—MeOH=250 g, $VAc_{ini}$=200 g, TTT=1.2 g, AIBN=9.5 g and $propanal_{ini}$=6.79 g. Delayed addition of propanal=25 g and VAc=50 g Ex. 46-48—Initial mixture—MeOH=250 g, $VAc_{ini}$=50 g, AIBN=9.5 g and $propanal_{ini}$=10.1 g. Delayed addition of propanal=43 g, TTT=2.15 g and VAc=199 g Ex. 48—required hydrolysis levels were not achieved.

Ex. 49—Initial mixture—MeOH=250 g, $VAc_{ini}$=50 g, AIBN=9.5 g and $propanal_{ini}$=10.1 g. Delayed addition of TTT=2.15 g and VAc=199 g. Delayed addition of propanal=43 g separate from VAc and TTT delayed feed.

The feed time in each case indicates the time period over which the delayed components were added. The total reaction time (including the feed time) was 5 hours in each case. The many examples above illustrate the synthesis and properties of polyvinyl acetates and polyvinyl alcohols made using solution polymerisation.

The influence of the type of initiator on the polymer properties was investigated.

The polymers of Table 7 below were synthesised and characterised using the general method described above in "A" and "B". The vinyl acetate polymers of the examples were typically polymerised at 70° C., with 248.8 g of VAc, 2.15 g of TTT, 10.1 g of propanal and MeOH (typically 214 g, but differs according to the example) initially present in the reaction mixture; with propanal=43 g being added continuously to the reaction mixture over a period of an hour. The polymerisation being maintained at the reaction temperature for a further 4 hours after all of the propanal had been added. The initiator and initiator charging method are described below. The polyvinyl acetates so obtained were then hydrolysed to polyvinyl alcohols in accordance with the general method described previously.

TABLE 7

| Example | Initiator | I:Vac (mol:mol), % | Conversion (%) | K-value | DH (mol %) | $UV_{280}$ | $UV_{320}$ | 4% (mPa · s) |
|---|---|---|---|---|---|---|---|---|
| 101 | AIBN | 1.28 | 89 | 29 | 81.9 | 14.4 | 1.9 | 3.2 |
| 102 | AIVN | 1.44 | 89 | 29 | 77.41 | 12.8 | 1.2 | 2.8 |
| 103 | tBP2EH | 1.04 | 98 | 29 | 73.8 | 13.8 | 1.6 | 2.5 |
|  |  |  |  |  | 75.6 | 14 | 1.6 |  |
| 104 | tBP2EH | 0.8 | 93 | 29 | 72.2 | 14.6 | 1.7 | 2.5 |
| 105 | tBP2EH | 0.56 | 96 | 28 | 76.2 | 14.8 | 1.6 | 2.7 |
|  |  |  |  |  | 78.6 | 16.0 | 1.7 |  |
|  |  |  |  |  | 81.9 | 16.4 | 1.8 |  |
| 106 | tBP2EH | 0.32 | 87 | 26 | 75.5 | 15.6 | 1.6 | 2.6 |
|  |  |  |  |  | 80.5 | 17.0 | 2.0 |  |

"I" in third column indicates "Initiator"

In Examples 101 to 106 below, the subscript "ini" refers to the amount initially in the reaction mixture.

Ex. 101—$AIBN_{ini}$=4.94 g. AIBN=1.14 g added as 1 aliquot after 45 minutes polymerisation.

Ex. 102—$MeOH_{ini}$=209 g, $AIVN_{ini}$=6.5 g. AIVN=1.5 g dissolved in 5 g MeOH added as 1 aliquot after 45 minutes polymerisation Ex. 103—$^tBP2EH_{ini}$=3.5 g. $^tBP2EH$=1.5 g and further aliquots added after 45 minutes and 1 hour 30 minutes polymerisation, respectively Ex. 104—$^tBP2EH_{ini}$=3.5 g. $^tBP2EH$=1.5 g added as 1 aliquot after 45 minutes of polymerisation. The unhydrolysed polyvinyl acetate of Ex. 104 had $M_n$=3,700 g·mol$^{-1}$, $M_w$=334,900 g·mol$^{-1}$, PDI=91, MH=0.42.

Ex. 105—$MeOH_{ini}$=194 g, $^tBP2EH_{ini}$=1.5 g. $^tBP2EH$=2 g dissolved in 20 g MeOH were added in a delayed manner, but continuously over a period of 2 hours 30 minutes.

Ex. 106—$MeOH_{ini}$=194 g, $^tBP2EH_{ini}$=0.5 g. $^tBP2EH$=1.5 g dissolved in 20 g MeOH were added in a delayed manner, but continuously over a period of 2 hours 30 minutes.

It can be seen from Table 7 that the use of different initiators, or different molar quantities of initiator on vinyl acetate, or a different protocol for the addition of the initiator, did not dramatically affect the properties of the polyvinyl acetates and the polyvinyl alcohols. The intensities of the $UV_{280}$ absorption peak, the K-value and the 4% solution viscosity measurements were all similar, and similar to those described previously.

The examples of Table 7 illustrate that it is possible to make polymers which are not gelled and which maintain the properties of the final polyvinyl alcohols, using a variety of initiators capable of generating free radicals. Furthermore, sufficiently high UV absorbance values can be generated by either adding said initiator in the initial monomer charge, at the start of the polymerisation or by a combination of both initial and delayed charging of the initiator.

TABLE 7.1

| | Unhydrolysed polyvinyl acetate | | | |
|---|---|---|---|---|
| sample | K Value | $M_n$ g/mol | $M_w$ g/mol | PDI | MH |
| EX. 104 | 29 | 3,700 | 334,900 | 91 | 0.42 |

The data shown in Table 7.1 confirms the formation of a hyperbranched polyvinyl acetate.

The Effect of Changing the Chain Transfer Agent was Investigated.

TABLE 8

| Example No. | CTA:TTT (mol/mol) | CTA:VAc (mol/mol) | Conversion (%) | K-value | DH (mol %) | $UV_{280}$ | $UV_{320}$ | 4% viscosity (mPa·s) |
|---|---|---|---|---|---|---|---|---|
| 104 | 106 | 31.6 | 98 | 29 | 72.2 | 14.6 | 1.7 | 2.5 |
| 108 | 83.8 | 25.0 | 92 | 41 | 73.2 | 13.4 | 1.6 | 3.1 |
| | | | | | 76.1 | 14.1 | 1.7 | |
| | | | | | 79.2 | 14.4 | 1.9 | |
| 109 | 106 | 31.6 | 95 | <20 | 80.1 | 22.2 | 3.74 | 2.3 |
| 110 | 85.4 | 25.5 | 95 | 29 | 75.8 | 16.6 | 2.4 | 2.5 |
| | | | | | 77.7 | 16.5 | 2.3 | |
| 111 | 98.2 | 29.3 | 95 | 23 | 75.5 | 19.4 | 2.3 | 2.2 |
| | | | | | 77.0 | 18.6 | 2.4 | |

Ex. 104 and 108 used propanal, and Ex. 109 and 111 used butyraldehyde.

Ex. 104—propanal$_{ini}$=10.1 g, propanal$_{del}$=43.0 g
Ex. 108—propanal$_{ini}$=8.0 g, propanal$_{del}$=34.0 g
Ex. 109—butyraldehyde$_{ini}$=12.54 g, butyraldehyde$_{del}$=53.4 g
Ex. 110—butyraldehyde$_{ini}$=10.1 g, butyraldehyde$_{del}$=43.0 g
Ex. 111—butyraldehyde$_{ini}$=11.6 g, butyraldehyde$_{del}$=49.5 g The polyvinyl acetates were prepared using the general method described above. All reactions were performed at 70° C., with VAc=248.8 g, $^t$BP2EH=3.5 g, TTT=2.15 g, MeOH=214 g and an initial amount of chain transfer agent (indicated by the subscript "ini") initially present in the reaction mixture, with an amount of chain transfer agent (denoted by the subscript "del") being added continuously to the polymerising reaction mixture over one hour. The polymerisation reaction being maintained at 70° C. for a further 4 hours after all of the chain transfer agent had been added. An aliquot of 1.5 g of $^t$BP2EH was added after 45 minutes polymerisation.

The results shown in Table 8 indicate that the intensity of the UV$_{280}$ absorption peak considerably increased when butyraldehyde was substituted for propanal as the chain transfer agent (on an equivalent molar basis). Without being bound by theory, this observation indicates that a greater concentration of the desired (C=C)$_2$C=O moieties are present when butyraldehyde is used. The K-values and 4% solution viscosity values obtained for Ex. 109 and Ex. 110 (made using butyraldehyde) were lower than those of Ex. 107 and Ex. 108 (made using propanal) respectively. Without being bound by theory, this is consistent with more chain transfer reactions occurring with butyraldehyde.

TABLE 8.1

Unhydrolysed polyvinyl acetate

| sample | K Value | M$_n$ g/mol | M$_w$ g/mol | PDI | MH |
|---|---|---|---|---|---|
| EX. 111 | 29 | 4,600 | 142,900 | 91 | 0.42 |

The data shown in Table 8.1 confirms the formation of a hyperbranched polyvinyl acetate.

Different polymerisation protocols were investigated using the general methodology described above in "A" and "B".

TABLE 9

| Example | CTA:TTT (mol/mol) | Temp. (° C.) | Feed (hours) | Conversion (%) | K-value | DH (mol %) | UV$_{280}$ | UV$_{320}$ | 4% viscosity (mPa · s) |
|---|---|---|---|---|---|---|---|---|---|
| 112 | 72.9 | 70 | 1 | 92 | 34.5 | 75.1 | 12.4 | 1.9 | 3.8 |
|  |  |  |  |  |  | 76.6 | 12.1 | 1.7 |  |
|  |  |  |  |  |  | 80.4 | 13.3 | 2 |  |
| 113 | 65.7 | 70 | 1 | 100 | 40 | 73.8 | 11.5 | 1.7 | 3.8 |
|  |  |  |  |  |  | 77.8 | 12 | 1.7 |  |
|  |  |  |  |  |  | 80.8 | 12.6 | 1.7 |  |
| 114 | 85.8 | 70 | 1.5 | 97 | 31 | 70.8 | 10.2 | 1.3 | 3.2 |
|  |  |  |  |  |  | 78.3 | 11.5 | 1.5 |  |
|  |  |  |  |  |  | 80.9 | 12.4 | 1.2 |  |
| 115 | 61.1 | 70 | 1.5 | 98 | 48 | ~72 | 8.2 | 1.4 | 5.1 |
|  |  |  |  |  |  | 75.8 | 9.1 | 1.5 |  |
|  |  |  |  |  |  | 79.9 | 9.1 | 1.4 |  |
| 116 | 106.0 | 70 | 1 | 98 | 27 | 73.7 | 14.5 | 2.1 | 3.0 |
|  |  |  |  |  |  | 77.7 | 14.6 | 2.2 |  |
|  |  |  |  |  |  | 80.8 | 14.7 | 2.1 |  |
| 117 | 63.7 | 70 | 2.5 | 91 | 29.5 | 73.0 | 12.6 | 1.9 | 2.9 |
|  |  |  |  |  |  | 76.3 | 11.9 | 1.6 |  |
|  |  |  |  |  |  | 79.7 | 13.7 | 2.0 |  |
| 118 | 67.9 | 70 | 1.5 | 92 | 48 | 71.8 | 9.8 | 2.1 | 4.1 |
|  |  |  |  |  |  | 75.7 | 10.8 | 2.2 |  |
|  |  |  |  |  |  | 77.7 | 10.6 | 2.1 |  |
|  |  |  |  |  |  | 80.8 | 10.9 | 2.0 |  |

Ex. 112—Initial mixture of MeOH=200 g, VAc$_{ini}$=100 g, TTT$_{ini}$=0.7 g, $^t$BP2EH$_{ini}$=3.5 g. $^t$BP2EH=1.5 g was added after 45 minutes polymerisation. Delayed addition of MeOH=14 g, TTT=1.45 g and VAc=148.8 g which was added over the 1 hour period after the start of polymerisation. Delayed addition of propanal=36.5 g over the 1 hour period after the start of polymerisation, and separate from the VAc and TTT delayed feed.

Ex. 113—Initial mixture—MeOH=214 g, VAc$_{ini}$=100 g, =T$_{ini}$=0.7 g, $^t$BP2EH$_{ini}$=3.5 g. $^t$BP2EH=1.5 g was added as an aliquot after 45 minutes of polymerisation. Delayed addition of TTT=1.45 g and VAc=148.8 g which was added over the 1 hour period after the start of polymerisation. Delayed addition of propanal=32.9 g over the 1 hour period after the start of polymerisation, and separate from the VAc and TTT delayed feed.

Ex. 114—Initial mixture—MeOH=210 g, VAc$_{ini}$=248.8 g, =T$_{ini}$=0.71 g, $^t$BP2EH$_{ini}$=3.5 g. $^t$BP2EH=1.5 g was added as an aliquot after 45 minutes polymerisation. Multiple additions of TTT=0.72 g in 2 g MeOH were made, one after 45 minutes and one after 1 hour 15 minutes after the start of polymerisation. Delayed addition of propanal=43 g was made over a period of 1 hour 30 minutes after that start of polymerisation.

Ex. 115—Initial mixture—MeOH=210 g, VAc$_{ini}$=248.8 g, =T$_{ini}$=0.71 g, $^t$BP2EH$_{ini}$=3.5 g. $^t$BP2EH=1.5 g was added as an aliquot after 45 minutes polymerisation. Multiple additions of TTT=0.72 g in 2 g MeOH were made, one after 45 minutes and one after 1 hour 15 minutes after the start of polymerisation. Delayed addition of propanal=30.6 g was made over a period of 1 hour 30 minutes after the start of polymerisation.

Ex. 116—Initial mixture—MeOH=196.2 g, VAc$_{ini}$=248.8 g, $^t$BP2EH$_{ini}$=3.5 g. $^t$BP2EH=1.5 g was added after 45 minutes polymerisation. Delayed addition of MeOH=21.4 g and TTT=2.15 g was made over the period of 1 hour after the start of polymerisation. Delayed addition of propanal=43 g was also made over the period of 1 hour after the start of polymerisation, separate from the TTT delayed feed.

Ex. 117—Initial mixture—MeOH=856 g, a mixture was formed of VAc=995.2 g, TTT=8.6 g, $^t$BP2EH=14 g, propanal=127.6 g. 20 wt % of the mixture was initially charged to the reactor, before the start of the polymerisation, with the remaining 80% of the mixture added as a delayed addition over 2 hours 30 minutes. The batch was then cooked for 2 hours 30 minutes at 80° C.

Ex. 118—Initial mixture—MeOH=210 g, VAc$_{ini}$=248.8 g, =T$_{ini}$=0.71 g, $^t$BP2EH$_{ini}$=3.5 g. $^t$BP2EH=1.5 g was added as an aliquot after 45 minutes polymerisation. Multiple additions of TTT=0.72 g in 2 g MeOH were made, one after 45 minutes and one after 1 hour 15 minutes after the start of polymerisation. Delayed addition of propanal=34.0 g was made over a period of 1 hour 30 minutes after that start of polymerisation.

TABLE 9.1

Unhydrolysed polyvinyl acetate

| Sample | K Value | $M_n$ g/mol | $M_w$ g/mol | PDI | MH |
|---|---|---|---|---|---|
| EX. 115 | 48 | 8,800 | 1,428,700 | 162 | 0.44 |
| Ex. 118 | 48 | 6,900 | 1,029,500 | 149 | 0.43 |

The data shown in Table 9.1 confirms the formation of a hyperbranched polyvinyl acetate.

Further examples of polymers of the present invention were synthesised using a suspension polymerisation process.

C—Suspension Polymerisation to Form PVAc 1200 g of H$_2$O, 216 g of salt, 1.36 g of cellulose ether, 0.44 g of sodium carbonate, 4.44 g of tetrasodium pyrophosphate, 7.28 g of sodium bicarbonate, 0.4 ml of formic acid and 0.6 mL of defoamer were charged and mixed in the 4 litre reactor at 30° C. over 30 minutes. A solution of 900 g of VAc, 5.8 g of TTT and 89.8 g of propanal was added and water bath increased to 59° C. After 10 minutes at 59° C., 35 g of AIBN solubilised in 100 g of VAc was added and temperature set at 72° C. After the end of reflux, the suspension was maintained at 88° C. for 30 minutes, then distilled at 120° C. for 1 hour 45 minutes. Once the reaction cooled to 40° C., 44 g of salt was added and the reaction media stirred for 1 hour, before cooling.

D—Formation of PVOH from PVAc Made by Suspension Polymerisation

The beads made in accordance with "C" above were extracted, washed with water and dried overnight. A solution was prepared by dissolving the bead in methanol at 45% (w/w). This solution was then used for hydrolysis, using 14 mL of methanolic sodium hydroxide (10% (w/w)) (as described above in relation to solution polymerisation) for 100 g of polymer.

The Example of Table 10 illustrates the production of PVAc and PVOH using a suspension polymerisation process.

The example of table 10 illustrates that it is possible to make polyvinyl acetates and polyvinyl alcohols of the present invention using suspension polymerisation.

Furthermore, no delayed feed of CTA is required in order to prevent gelling. Without being bound by theory, this may be the result of the relatively high solubility of propanal in water which reduces the contact between the CTA and the monomers.

Some of the polyvinyl alcohol examples described above were used as a primary suspending agent in a suspension PVC polymerisation process, either in a 1 litre reactor or in a 10 litre reactor.

1 Litre Reactor Conditions

Various samples of a poly(vinyl chloride) composition were prepared on the basis of the following recipe:

TABLE 11

| | |
|---|---|
| Demineralised water | 350 g |
| Vinyl chloride monomer | 189 g |
| Di (4-tert-butylcyclohexyl) peroxydicarbonate | 1,000 ppm (w/w) solids on vinyl chloride |
| Primary suspending agent | 1,300 ppm (w/w) solids on vinyl chloride |
| Secondary suspending agent Alcotex ® 552P (supplied by Synthomer (UK) Ltd.), partially hydrolysed poly(vinyl acetate) having a degree of hydrolysis of about 55 mole % and a random distribution of acetate groups, 40% (w/w) aqueous solution | 0-450 ppm (w/w) solids on vinyl chloride |
| Sodium bicarbonate (1% (w/w) solution in demineralized water) | 800 ppm (w/w) solids on vinyl chloride |

Demineralised water, suspending agents, buffer and initiator were all charged to a 1 litre Büchi stainless steel reactor (which had been previously coated with Alcotex® 225 Build-Up suppressant supplied by Synthomer (UK) Ltd.) and assembled onto the rig. The recipe in Table 11 was designed to give a final grain size that was consistent with a typical commercial product. The reactor was then pressure tested, degassed to atmospheric and then vinyl chloride monomer charged via a volumetric bomb under nitrogen pressure. A suspension of vinyl chloride was prepared under stirring with about 750 rpm. The reactor was then heated within 6 minutes under agitation at 750 rpm to the desired polymerisation temperature within the range of 57° C., stirring at about 750 rpm was continued, the maximum pressure was recorded and the reaction stopped after a pressure drop of 0.2 MPa (by cooling and degassing to atmospheric pressure). The reactor was then subjected to a vacuum of approximately 50 kPa for 45 minutes. The reactor contents were then decanted in to a filter funnel and washed twice with 1% (w/w) sodium lauryl sulphate solution (as an anti-static treatment). The sample was then placed in a circulating fan oven at 50° C. for 12 hours to dry. A PVC analysis was then carried out and the results are shown in Table 12.

TABLE 10

| Example No. | CTA:TTT (mol/mol) | CTA | K-value | DH (mol %) | UV$_{280}$ | UV$_{320}$ | 4% viscosity. (mPa · s) |
|---|---|---|---|---|---|---|---|
| 53 | 66.5 | Propanal | 28 | 70.0 | 13.1 | 1.6 | 2.45 |

The results obtained in the 1 litre reactor are shown below in Table 12.

TABLE 12

| PVOH used as primary suspending agent | TTT:VAc (mol:mol) % | DH (mol %) | $UV_{280}$ | $UV_{320}$ | $D_{50}$ (μm) | GSD | CPA (%) | BD (g/L) | PF |
|---|---|---|---|---|---|---|---|---|---|
| C. Ex. 6 | 0.00 | 73.0 | 5.7 | 4.6 | 125 | 0.25 | 18.7 | 516 | 46.5 |
| C. Ex. 7 | 0.00 | 80.0 | 0.1 | 0.05 | 162 | 0.53 | 13.1 | 649 | 54.9 |
| C. Ex. 3 | 0.00 | 75.5 | 4.4 | 0.9 | 198 | 0.23 | 24.8 | 467 | 44.9 |
| C. Ex. 3 | 0.00 | 78.5 | 4.6 | 0.9 | 232 | 0.62 | 16.2 | 504 | 44.2 |
| Ex. 27 | 0.10 | 75.4 | 4.9 | 0.9 | 166 | 0.23 | 15.2 | 522 | 45.3 |
| Ex. 27 | 0.10 | 80.5 | 5.5 | 0.9 | 191 | 0.28 | 11.5 | 570 | 47.3 |
| C. Ex. 4 | 0.17 | 74.2 | 0.8 | 0.8 | 163 | 0.25 | 16.7 | 506 | 44.6 |
| C. Ex. 4 | 0.17 | 74.2 | 0.8 | 0.8 | 148 | 0.28 | 20.8 | 505 | 46.5 |
| C. Ex. 4 | 0.17 | 80.6 | 0.8 | 0.8 | 128 | 0.23 | 10.5 | 543 | 44.5 |
| C. Ex. 4 | 0.17 | 80.6 | 0.8 | 0.8 | 157 | 0.28 | 13.8 | 539 | 48.5 |
| Ex. 30 | 0.17 | 74.4 | 6.5 | 1.4 | 127 | 0.21 | 16.4 | 519 | 45.6 |
| Ex. 30 | 0.17 | 74.4 | 6.5 | 1.4 | 125 | 0.27 | 25.2 | 488 | 47.1 |
| Ex. 30 | 0.17 | 77.1 | 6.5 | 2.5 | 117 | 0.29 | 13.2 | 545 | 46.1 |
| Ex. 32 | 0.20 | 73.5 | 7.6 | 1.8 | 119 | 0.27 | 17.4 | 508 | 45.1 |
| Ex. 32 | 0.20 | 73.5 | 7.6 | 1.8 | 107 | 0.32 | 21.6 | 507 | 47.2 |
| Ex. 33 | 0.24 | 72.0 | 7.9 | 1.5 | 137 | 0.31 | 20.1 | 524 | 47.9 |
| Ex. 33 | 0.24 | 72.0 | 7.9 | 1.5 | 120 | 0.30 | 23.0 | 504 | 47.6 |
| 104 | 0.3 | 72.2 | 14.6 | 1.7 | 121 | 0.27 | 24.4 | 468 | 44.9 |
| 108 | 0.3 | 73.2 | 13.4 | 1.6 | 123 | 0.24 | 17.2 | 567 | 50.2 |
| 108 | 0.3 | 76.1 | 14.1 | 1.7 | 90 | 0.73 | 14.0 | 576 | 49.2 |
| 111 | 0.3 | 75.5 | 19.4 | 2.3 | 121 | 0.27 | 27.3 | 463 | 45.8 |
| 111 | 0.3 | 77.0 | 18.6 | 2.4 | 110 | 0.30 | 12.2 | 610 | 51.0 |
| 112 | 0.3 | 75.1 | 12.4 | 1.9 | 115 | 0.31 | 20.0 | 543 | 49.7 |
| 113 | 0.3 | 73.8 | 11.5 | 1.7 | 114 | 0.29 | 16.0 | 568 | 49.6 |
| 113 | 0.3 | 77.8 | 12.0 | 1.7 | 92 | 0.79 | 13.0 | 613 | 51.7 |
| 114 | 0.3 | 70.8 | 10.2 | 1.3 | 119 | 0.27 | 25.6 | 507 | 49.2 |
| 114 | 0.3 | 78.3 | 11.5 | 1.5 | 123 | 0.25 | 20.2 | 492 | 45.1 |
| 115 | 0.3 | 75.8 | 9.1 | 1.5 | 116 | 0.28 | 14.4 | 567 | 48.7 |
| 116 | 0.3 | 73.7 | 14.5 | 2.1 | 117 | 0.29 | 16.0 | 577 | 50.5 |
| 117 | 0.3 | 73.0 | 12.6 | 1.9 | 136 | 0.27 | 23.4 | 521 | 49.38 |
| 118 | 0.3 | 71.8 | 9.8 | 2.1 | 119 | 0.26 | 14.0 | 566 | 48.3 |
| 118 | 0.3 | 75.7 | 10.8 | 2.2 | 122 | 0.29 | 12.6 | 596 | 50.1 |
| 118 | 0.3 | 77.7 | 10.6 | 2.1 | 93 | 0.77 | 10.8 | 606 | 49.8 |

C. Ex. 6 = Alcotex ® B72 - available from Synthomer (UK) Limited
C. Ex. 7 = Alcotex ® 80 - available from Synthomer (UK) Limited Those skilled in the art will realise that the TTT:VAc, DH, $UV_{280}$ and $UV_{320}$ used in Tables 12 and 13 refer to the properties of the PVOH used as a suspending agent, and that $D_{50}$, GSD, CPA, BD and PF are properties of the polyvinyl chloride (PVC).

10 litre Reactor Conditions

The monomer was vinyl chloride. The example PVOH was added at 1300 ppm. No secondary suspending agent was used. The buffer was 200 ppm (as a 1% (w/w) sodium bicarbonate solution). The initiator was 1000 ppm di(4-tert-butylcyclohexyl) peroxydicarbonate. The reaction temperature was 57° C., in a 10 litre stainless steel reactor vessel coated with Alcotex® 225 Build-up suppressant, with a standard stirrer operating at a stirrer speed of 600 rpm.

The results obtained using the 10 litre reactor are shown below in Table 13.

TABLE 13

| PVOH used as primary suspending agent | TTT:VAc (mol:mol), % | DH (mol %) | $UV_{280}$ | $UV_{320}$ | $D_{50}$ (μm) | GSD | CPA (%) | BD (g/L) | PF |
|---|---|---|---|---|---|---|---|---|---|
| C. Ex. 6 | 0.00 | 73.0 | 5.7 | 4.6 | 132 | 0.26 | 29.2 | 498 | 50.2 |
| C. Ex. 8 | 0.00 | 72.5 | 3.6 | 1.5 | 180 | 0.24 | 27.8 | 504 | 50.0 |
| C. Ex. 9 | 0.00 | 78.0 | 3.7 | 1.7 | 168 | 0.32 | 23.6 | 511 | 48.6 |
| C. Ex. 5 | 0.17 | 74.8 | 0.6 | 0.4 | 205 | 0.39 | 24.7 | 521 | 50.5 |
| Ex. 36 | 0.24 | 72.0 | 8.5 | 1.0 | 138 | 0.42 | 24.5 | 495 | 47.6 |
| Ex. 36 | 0.24 | 76.4 | 9.1 | 0.8 | 133 | 0.28 | 24.4 | 522 | 50.0 |
| Ex. 36 | 0.24 | 74.9 | 7.8 | 0.8 | 119 | 0.63 | 21.8 | 493 | 45.9 |
| C. Ex. 5 | 0.17 | 77.3 | 0.5 | 0.3 | 173 | 0.34 | 26.7 | 535 | 52.5 |
| Ex. 38 | 0.30 | 74.5 | 12.3 | 1.3 | 100 | 0.31 | 28.2 | 494 | 49.2 |

C. Ex. 8 = Alcotex ® 72.5 - available from Synthomer (UK) Limited
C. Ex. 9 = Alcotex ® 78 - available from Synthomer (UK) Limited The data from Tables 12 and 13 suggest that the polyvinyl alcohols of the present invention performed successfully as primary suspending agents in the production of PVC.

The data further indicate that the polyvinyl alcohols of the present invention have a positive effect on reducing the grain size of the PVC. Without wishing to be bound by theory, this is expected to be associated with both the highly branched nature of the polyvinyl alcohol and with the presence of —(C=C)$_2$C=O moieties. Indeed, there appears to be an inverse correlation between the intensity of the UV$_{280}$ peak and the grain size as measured by D$_{50}$ i.e. the greater the intensity of the UV$_{280}$ peak, the smaller the polymer grain size. Furthermore, the polyvinyl alcohols of the present invention are typically white, or off-white, not yellow, orange or brown. This lack of colouration may be desirable.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The polymers of the examples above are made from one monofunctional monomer and one multifunctional monomer. Those skilled in the art will realise that more than one monofunctional monomer and/or more than one multifunctional monomer may be used.

The examples above illustrate the use of vinyl acetate as the monofunctional monomer. Those skilled in the art will realise that other monofunctional monomers (such as acrylates) could be used as comonomers.

Likewise, multifunctional monomers other than those described above in the examples could be used. The examples above illustrate the use of propanal or butyraldehyde as the chain transfer agent. Other carbonyl-group containing chain transfer agents could be used.

The PVC polymerisation examples demonstrated in the present application are of a type known as cold charged, with the primary and secondary suspending agents being present at the beginning of the charging sequence. Other methods are known. Usually, water, protective colloid(s) and further optional additives are charged to the reactor first and then the liquefied vinyl chloride monomer and optional comonomer(s) are added. Optionally, the charging of the protective colloid may be simultaneous with the vinyl chloride monomer into a pre-heated reactor containing some or all of the aqueous phase. Optionally, the charging of the protective colloid may be simultaneous with some or all of the hot demineralised water which forms the aqueous phase in such a way that by the time the water, colloid(s) and monomer (such as vinyl chloride) are charged the reactor is at or near to the desired polymerisation temperature. This process is known as 'hot charging'. Optionally, the initiator is then charged to the reactor.

Furthermore, it is well known in the state of the art that polyvinyl alcohols which can be used as primary suspending agents in PVC polymerisation can also be used to stabilise initiator dispersions which can be used in PVC polymerisations, for example see WO9818835

The polyvinyl alcohol primary suspending agent may be used in conjunction with other protective colloids, such as other primary protective colloids and with secondary and tertiary protective colloids. Specific examples of protective colloids are listed in Ullmann's Encyclopedia of Industrial Chemistry, 5th Edition, 1992, page 722, Table 3.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of making a branched water-soluble polymer comprising (C=C)—(C=C)—CO groups, the method comprising:
   (i) Providing, in admixture, at least one monofunctional monomer comprising one polymerisable carbon-carbon double bond per monomer, at least one multifunctional monomer comprising at least two polymerisable carbon-carbon double bonds per monomer, and at least one chain transfer agent comprising an aldehyde or a ketone;
   (ii) Forming a polymer from the mixture in a free radical polymerisation reaction; and
   (iii) Hydrolysing the polymer thereby forming a hydrolysed, water-soluble polymer, wherein the ratio of the number of moles of chain transfer agent comprising an aldehyde or ketone to the number of moles of multifunctional monomer is at least 10:1 and no more than 300:1.

2. The method of claim 1 wherein the amount of chain transfer agent comprising an aldehyde or ketone is at least 50 mol % and no more than 50 mol % of the amount of monofunctional monomer.

3. The method of claim 1 wherein all of the chain transfer agent comprising an aldehyde or ketone is admixed with the at least one monofunctional monomer and the at least one multifunctional monomer at the start of the polymerisation reaction.

4. The method of claim 3 wherein at least one polymerisation initiator is present at the start of the polymerisation reaction.

5. The method of claim 1 wherein the method comprises delaying addition of at least some of the chain transfer agent comprising an aldehyde or ketone.

6. The method of claim 5 wherein less than 10% of the chain transfer agent comprising an aldehyde or ketone is added to the reaction mixture at the commencement of the polymerisation reaction.

7. The method of claim 5 comprising adding at least 50% of said chain transfer agent before the conversion % of the monofunctional monomer reaches 60%.

8. The method of claim 5 comprising providing at least a portion of the chain transfer agent comprising an aldehyde or ketone in admixture with the at least one monofunctional monomer and the at least one multifunctional monomer before the start of the polymerisation reaction.

9. The method of claim 8 wherein at least one polymerisation initiator is present at the start of the polymerisation reaction.

10. The method of claim 1 comprising providing more than one monofunctional monomer, each monofunctional monomer comprising no more than one polymerisable carbon-carbon double bond.

11. The method of claim 1 comprising: (i) a solution polymerisation as a single solvent,
   (ii) a solution polymerisation wherein the solvents used in the solution polymerisation comprise a mixture of a first solvent component having a first chain transfer constant and a second solvent component having a second chain transfer constant, the second chain transfer constant being at least five times greater than the first chain transfer constant, or
(iii) a suspension polymerisation.

12. The method of claim 1 wherein the polymer is hydrolysed to form a hydrolysed polymer having a degree of hydrolysis of at least 60 mol %.

13. The method of claim 1 wherein the polymer has a UV absorbance at 280 nm which is at least three times that at 320 nm.

14. A branched polymer makeable in accordance with the method of claim 1.

15. The method of claim 1 wherein the admixture further comprises at least one polymerisation initiator.

16. A method of making a branched water-soluble polymer comprising (C=C)—(C=C)CO groups, the method comprising:
   (i) Providing, in admixture, at least one monofunctional monomer comprising one polymerisable carbon-carbon double bond per monomer, at least one multifunctional monomer comprising at least two polymerisable carbon-carbon double bonds per monomer, and at least one chain transfer agent comprising an aldehyde or a ketone;
   (ii) Forming a polymer from the mixture in a free radical polymerisation reaction; and
   (iii) Hydrolysing the polymer thereby forming a hydrolysed, water-soluble polymer,
   wherein the ratio of the number of moles of chain transfer agent comprising an aldehyde or ketone to the number of moles of multifunctional monomer is at least 10:1 and no more than 300:1; and wherein the amount of multifunctional monomer is at least 0.05 mol % and no more than 2 mol % of the monofunctional monomer content.

17. A method of making a branched water-soluble polymer comprising (C=C)—(C=C)—CO groups, the method comprising:
   providing, in admixture, at least one monofunctional monomer comprising one polymerisable carbon-carbon double bond per monomer, at least one multifunctional monomer comprising at least two polymerisable carbon-carbon double bonds per monomer, and at least one chain transfer agent comprising an aldehyde or a ketone;
   forming a polymer from the mixture in a free radical polymerisation reaction; and
   hydrolysing the polymer thereby forming said branched water-soluble polymer comprising (C=C)—(C=C)—CO groups.

18. A branched water-soluble polymer comprising residues of:
   (i) At least one monofunctional monomer having one polymerisable double bond per molecule;
   (ii) At least one multifunctional monomer having at least two polymerisable double bonds per molecule; and
   (iii) At least one chain transfer agent comprising an aldehyde or ketone,
   wherein the polymer comprises (C=C)—(C=C)—CO moieties located at chain ends, with a UV absorbance value at 280 nm which is at least three times that at 320 nm, and
   wherein the polymer has a dispersity (defined as $M_w/M_n$) of at least 3 and no more than 200.

19. The branched polymer of claim 18 comprising 0.5 mol % and no more than 45 mol % chain transfer agent comprising an aldehyde or ketone, based on the number of moles of residues of monofunctional monomer.

20. The branched polymer of claim 18 comprising ester and hydroxyl groups and having a degree of hydrolysis of at least 60 mol %.

21. The polymer of claim 20 wherein the polymer further comprises carboxylic acid groups.

22. The branched polymer of claim 18 wherein the intensity of the UV absorption peak at 280 nm generated by a solution of the polymer is at least four times the intensity of the UV absorption peak at 320 nm.

23. The branched polymer of claim 18 wherein the polymer contains conjugated carboxylic acid groups derived from the monofunctional monomer.

24. A method of performing a suspension polymerisation reaction, wherein the method comprises polymerising at least one unsaturated monomer,
   wherein the polymerisation is a suspension polymerisation performed using a primary suspending agent, and
   wherein the primary suspending agent comprises a branched polymer comprising (C=C)—(C=C)—CO moieties located at chain ends, with a UV absorbance value at 280 nm which is at least three times that at 320 nm, and
   wherein the primary suspending agent comprises a polymer according to claim 18.

25. A suspension polymerisation reaction composition comprising a continuous phase in which is dispersed liquid beads of monomer to be polymerised, and the branched polymer comprising (C=C)—(C=C)—CO moieties located at chain ends, with a UV absorbance value at 280 nm which is at least three times that at 320 nm, and the polymer according to claim 18.

* * * * *

UNITED STATES PATENT AND TRADEMARK OFFICE
CERTIFICATE OF CORRECTION

PATENT NO. : 10,711,073 B2  
APPLICATION NO. : 15/129731  
DATED : July 14, 2020  
INVENTOR(S) : Shaw et al.

Page 1 of 1

It is certified that error appears in the above-identified patent and that said Letters Patent is hereby corrected as shown below:

In the Claims

Column 36, Line 28, Claim 2, delete "50" and insert -- 5 --

Column 37, Line 15, Claim 16, delete "—(C=C)CO" and insert -- —(C=C)—CO --

Signed and Sealed this  
Twenty-second Day of December, 2020

Andrei Iancu  
*Director of the United States Patent and Trademark Office*